United States Patent
Wakamatsu

(10) Patent No.: US 11,843,846 B2
(45) Date of Patent: Dec. 12, 2023

(54) INFORMATION PROCESSING APPARATUS AND CONTROL METHOD THEREFOR

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/158,653

(22) Filed: Jan. 26, 2021

(65) Prior Publication Data

US 2021/0152731 A1 May 20, 2021

Related U.S. Application Data

(63) Continuation of application No. PCT/JP2019/028934, filed on Jul. 24, 2019.

(30) Foreign Application Priority Data

Jul. 31, 2018 (JP) ................................. 2018-143939
Jun. 13, 2019 (JP) ................................. 2019-110690

(51) Int. Cl.
| | | |
|---|---|---|
| H04N 5/232 | (2006.01) | |
| H04N 5/247 | (2006.01) | |
| H04N 23/61 | (2023.01) | |
| H04N 23/69 | (2023.01) | |
| H04N 23/90 | (2023.01) | |
| H04N 23/661 | (2023.01) | |

(52) U.S. Cl.
CPC ........... *H04N 23/61* (2023.01); *H04N 23/661* (2023.01); *H04N 23/69* (2023.01); *H04N 23/90* (2023.01)

(58) Field of Classification Search
None
See application file for complete search history.

(56) References Cited

U.S. PATENT DOCUMENTS 8,284,258 B1 * 10/2012 Cetin ................. G06K 9/00771
348/169
2003/0210329 A1 * 11/2003 Aagaard .............. H04N 17/002
348/E7.086

(Continued)

FOREIGN PATENT DOCUMENTS

JP 2007166420 A 6/2007
JP 2017050583 A 3/2017
(Continued)

*Primary Examiner* — Edemio Navas, Jr.
(74) *Attorney, Agent, or Firm* — Canon U.S.A., Inc. IP Division

(57) ABSTRACT

An information processing apparatus includes a reception unit configured to receive, from a plurality of image capturing apparatuses, at least one of information about designation of a subject by a user, information about automatic subject detection, and information about a manual operation on an image capturing lens by the user, a determination unit configured to determine a main image capturing apparatus and a sub image capturing apparatus from among the plurality of image capturing apparatuses, based on the information received by the reception unit, and a transmission unit configured to transmit a result of the determination to the main image capturing apparatus and transmit subject information set in the main image capturing apparatus to the sub image capturing apparatus.

25 Claims, 26 Drawing Sheets

(56) References Cited

U.S. PATENT DOCUMENTS

| | | | |
|---|---|---|---|
| 2012/0154593 A1* | 6/2012 | Anderson | H04N 23/00 348/157 |
| 2014/0253741 A1* | 9/2014 | Okada | H04N 23/90 348/207.1 |
| 2015/0103146 A1* | 4/2015 | Rose | H04N 13/239 348/47 |
| 2015/0116502 A1* | 4/2015 | Um | G06T 7/292 348/169 |
| 2016/0227128 A1* | 8/2016 | Um | H04N 9/3185 |
| 2017/0150050 A1 | 5/2017 | Umeo | |
| 2018/0343442 A1* | 11/2018 | Yoshikawa | H04N 21/438 |
| 2019/0191098 A1* | 6/2019 | Ishii | H04N 5/23299 |

FOREIGN PATENT DOCUMENTS

| | | |
|---|---|---|
| JP | 2017168885 A | 9/2017 |
| WO | 2016013409 A1 | 1/2016 |
| WO | 2018088037 A1 | 5/2018 |

\* cited by examiner

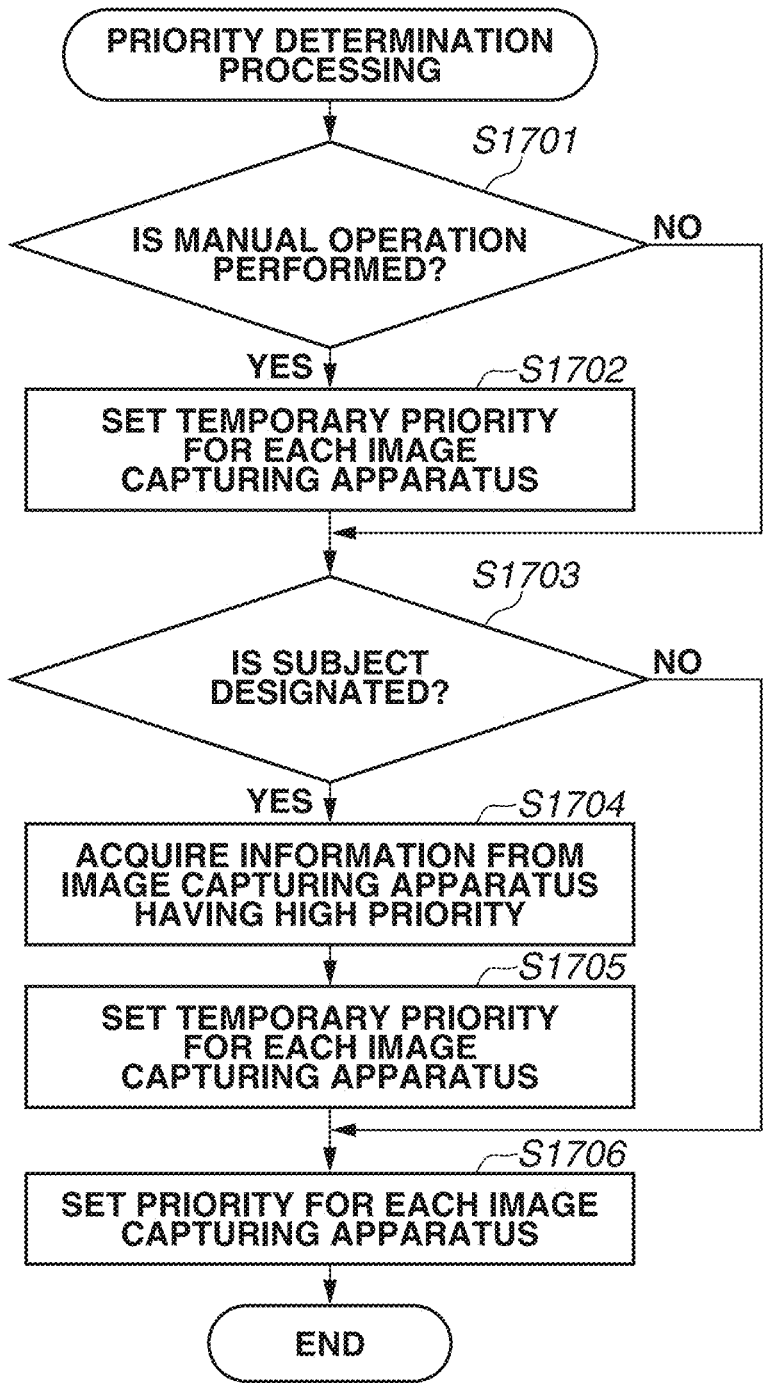

FIG.19

|  | TEMPORARY DETERMINATION 1 ||| TEMPORARY DETERMINATION 2 ||| TEMPORARY DETERMINATION 3 |||
| --- | --- | --- | --- | --- | --- | --- | --- | --- | --- |
|  | DISTANCE | SUBJECT RELIABILITY | TEMPORARY PRIORITY 1 | DISTANCE | SUBJECT RELIABILITY | TEMPORARY PRIORITY 2 | DISTANCE | SUBJECT RELIABILITY | TEMPORARY PRIORITY 3 |
| IMAGE CAPTURING APPARATUS 1 | $a_{11}$ | $b_{11}$ | $f(a_{11}, b_{11})$ | $a_{21}$ | $b_{21}$ | $f(a_{21}, b_{21})$ | $a_{31}$ | $b_{31}$ | $f(a_{31}, b_{31})$ |
| IMAGE CAPTURING APPARATUS 2 | $a_{12}$ | $b_{12}$ | $f(a_{12}, b_{12})$ | $a_{22}$ | $b_{22}$ | $f(a_{22}, b_{22})$ | $a_{32}$ | $b_{32}$ | $f(a_{32}, b_{32})$ |
| IMAGE CAPTURING APPARATUS 3 | $a_{13}$ | $b_{13}$ | $f(a_{13}, b_{13})$ | $a_{23}$ | $b_{23}$ | $f(a_{23}, b_{23})$ | $a_{33}$ | $b_{33}$ | $f(a_{33}, b_{33})$ |
| IMAGE CAPTURING APPARATUS 4 | $a_{14}$ | $b_{14}$ | $f(a_{14}, b_{14})$ | $a_{24}$ | $b_{24}$ | $f(a_{24}, b_{24})$ | $a_{34}$ | $b_{34}$ | $f(a_{34}, b_{34})$ |
| IMAGE CAPTURING APPARATUS 5 | $a_{15}$ | $b_{15}$ | $f(a_{15}, b_{15})$ | $a_{25}$ | $b_{25}$ | $f(a_{25}, b_{25})$ | $a_{35}$ | $b_{35}$ | $f(a_{35}, b_{35})$ |
| IMAGE CAPTURING APPARATUS 6 | $a_{16}$ | $b_{16}$ | $f(a_{16}, b_{16})$ | $a_{26}$ | $b_{26}$ | $f(a_{26}, b_{26})$ | $a_{36}$ | $b_{36}$ | $f(a_{36}, b_{36})$ |

INFORMATION PROCESSING APPARATUS AND CONTROL METHOD THEREFOR

CROSS-REFERENCE TO RELATED APPLICATIONS

This application is a Continuation of International Patent Application No. PCT/JP2019/028934, filed Jul. 24, 2019, which claims the benefit of Japanese Patent Applications No. 2018-143939, filed Jul. 31, 2018, and No. 2019-110690, filed Jun. 13, 2019, all of which are hereby incorporated by reference herein in their entirety.

BACKGROUND OF THE INVENTION

Field of the Invention

The present invention relates to an information processing apparatus and a control method for the information processing apparatus.

Background Art

A large number of image capturing apparatuses which is disposed at various positions and directed at various angles have been used to capture video images from various viewpoints. From among the video images captured by the plurality of image capturing apparatuses, a video image of an image capturing apparatus having a viewpoint desired by a user is acquired. However, it is difficult to appropriately retain a video image desired by the user from among the video images captured by a large number of image capturing apparatuses.

Japanese Patent Application Laid-Open No. 2014-215828 discusses a method in which each image capturing apparatus has focusing position information, image capturing apparatus position information, direction information, and the like, and a video image captured by an image capturing apparatus is selected based on attribute information about a user.

A technique for an image capturing apparatus including a pan or tilt function and including a function for automatically tracking a specific subject is also discussed. For example, Japanese Patent Application Laid-Open No. H05-28923 discusses a control method for obtaining a difference between center coordinates of a monitor and position coordinates of subject to output the subject at the center of a monitor screen, to control driving for pan and tilt angles to move the subject to the center of the screen.

CITATION LIST

Patent Literature

PTL 1: Japanese Patent Laid-Open No. 2014-215828
PTL 2: Japanese Patent Laid-Open No. H05-28923

In a system that performs image capturing from a plurality of viewpoints using a plurality of image capturing apparatuses, the plurality of image capturing apparatuses can be automatically controlled by driving, for example, pan, tilt, and zoom functions. However, for example, in a case where a subject is lost from the sight, it may be difficult to obtain a video image desired by a user. In a case where there is a plurality of inmate capturing target subjects or a plurality of image capturing target areas, an operation for the image capturing is difficult to be performed by a single user.

The present invention is directed to providing an information processing apparatus capable of easily controlling a plurality of image capturing apparatuses in a case where the plurality of image capturing apparatuses works in conjunction with each other, and a control method for the information processing apparatus.

SUMMARY OF THE INVENTION

According to an aspect of the present invention, an information processing apparatus includes a reception unit configured to receive, from a plurality of image capturing apparatuses, at least one of information about designation of a subject by a user, information about automatic subject detection, and information about a manual operation on an image capturing lens by the user, a determination unit configured to determine a main image capturing apparatus and a sub image capturing apparatus from among the plurality of image capturing apparatuses, based on the information received by the reception unit, and a transmission unit configured to transmit a result of the determination to the main image capturing apparatus and transmit subject information set in the main image capturing apparatus to the sub image capturing apparatus.

Further features of the present invention will become apparent from the following description of exemplary embodiments with reference to the attached drawings.

BRIEF DESCRIPTION OF THE DRAWINGS

FIG. 17 is a flowchart illustrating a priority determination processing procedure for each image capturing apparatus in a control unit to which information is sent from each image capturing apparatus.

FIG. 19 is a table illustrating an example of priority calculation for each image capturing apparatus in a case where temporary determinations 1 to 3 are detected.

DESCRIPTION OF THE EMBODIMENTS

Preferred exemplary embodiments of the present invention will be described in detail below with reference to the accompanying drawings.

First Exemplary Embodiment

<Configuration of Image Capturing Apparatus>

Figure 1A:
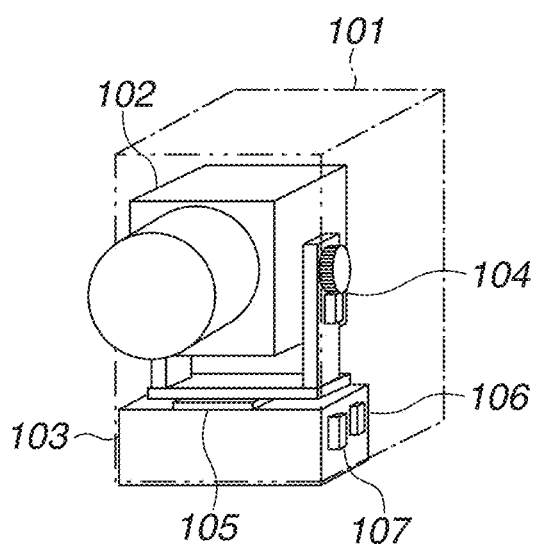
FIG. 1A is a diagram schematically illustrating an image capturing apparatus according to a first exemplary embodiment.
Figure 1B:
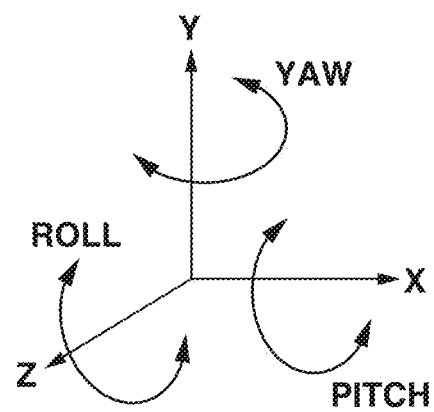
FIG. 1B is a diagram schematically illustrating an image capturing apparatus according to a first exemplary embodiment.

FIGS. 1A and 1B schematically illustrate an image capturing apparatus that is used for a control system including a plurality of the image capturing apparatuses which works in conjunction with each other, according to a first exemplary embodiment.

An image capturing apparatus 101 illustrated in FIG. 1A is provided with an operation member capable of performing a power supply switch operation (hereinafter referred to as a power supply button, but the operation member may be an operation member for, for example, tapping, flicking, and swiping on a touch panel), and the like. A lens barrel 102 serving as a casing including an image capturing lens unit for image capturing and an image sensor is attached to the image capturing apparatus 101, and is provided with a rotation mechanism capable of rotationally driving the lens barrel 102 with respect to a fixed portion 103. A tilt rotation unit 104 is a motor drive mechanism capable of rotating the lens barrel 102 in a pitch direction illustrated in FIG. 1B. A pan rotation unit 105 is a motor drive mechanism capable of rotating the lens barrel 102 in a yaw direction illustrated in FIG. 1B. Accordingly, the lens barrel 102 can be rotated in one or more axial directions. FIG. 1B illustrates definitions of three axes at the position corresponding to the fixed portion 103. An angular velocity meter 106 and an accelerometer 107 are mounted on the fixed portion 103 of the image capturing apparatus 101. Based on the angular velocity meter 106 and the accelerometer 107, vibrations of the image capturing apparatus 101 are detected and the tilt rotation unit 104 and the pan rotation unit 105 are rotationally driven based on a detected shake angle. Thus, a shake or inclination of the lens barrel 102, which is a movable portion, is corrected.

Figure 2:
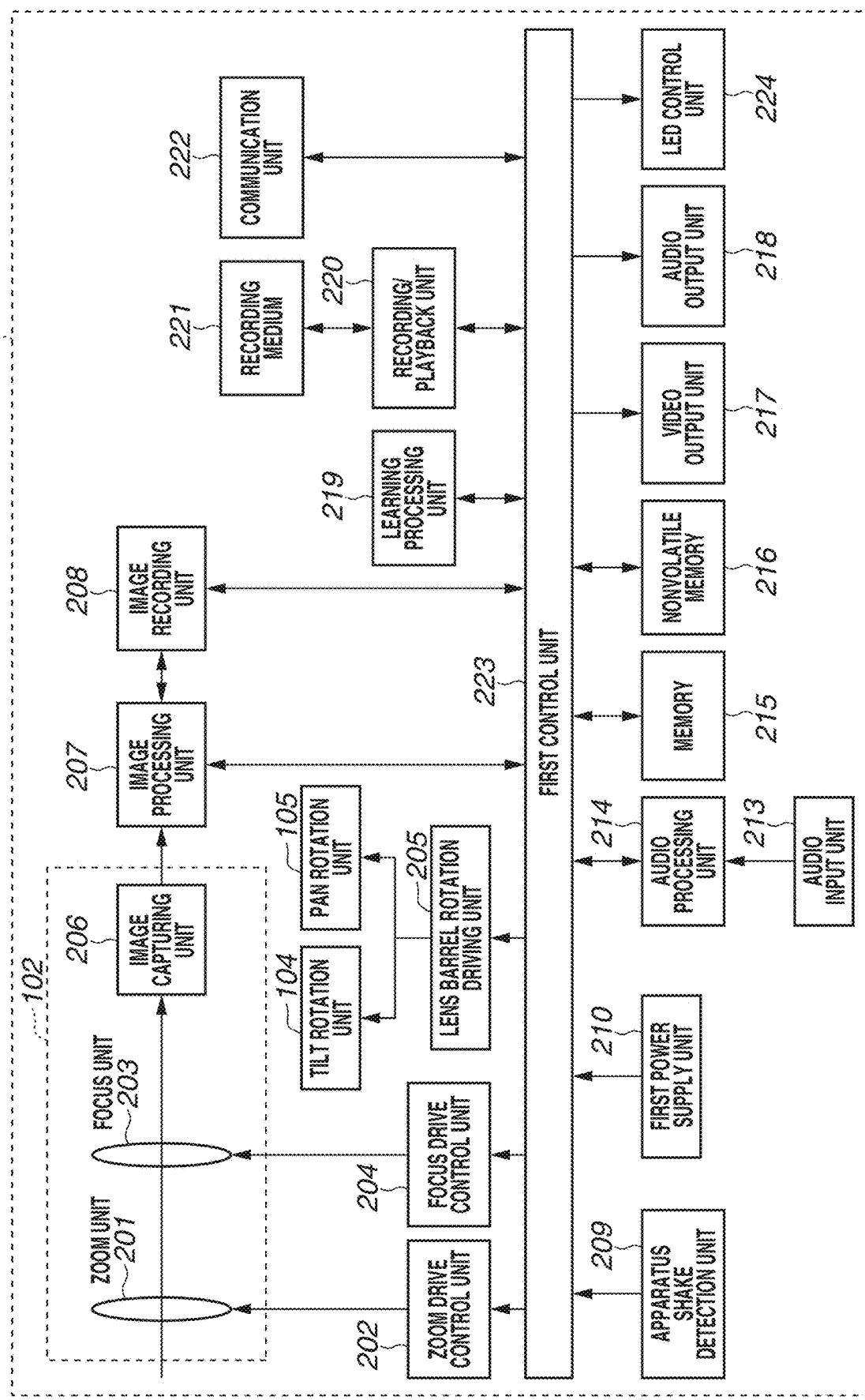
FIG. 2 is a block diagram illustrating a configuration of the image capturing apparatus according to the first exemplary embodiment.

FIG. 2 is a block diagram illustrating a configuration of the image capturing apparatus 101 according to the present exemplary embodiment.

In the configuration illustrated in FIG. 2, a first control unit 223 includes a processor (e.g., a central processing unit (CPU), a graphics processing unit (GPU), a microprocessor, or a micro processing unit (MPU)) and a memory (e.g., a dynamic random access memory (DRAM) or a static RAM). These components are used to control each block of the image capturing apparatus 101 by executing various processes, and to control data transfer between blocks. A nonvolatile memory (electrically erasable programmable read-only memory (EEPROM)) 216 is an electrically erasable and recordable memory, and stores constants, programs, and the like for operating the first control unit 223.

In the configuration illustrated in FIG. 2, a zoom unit 201 includes a zoom lens that changes a magnification. A zoom drive control unit 202 drives and controls the zoom unit 201. A focus unit 203 includes a lens for adjusting focus. A focus drive control unit 204 drives and controls the focus unit 203.

In an image capturing unit 206, an image sensor receives light that enters through each lens unit, converts electric charge information based on the amount of light into analog image data, and outputs the analog image data to an image processing unit 207. The image processing unit 207 applies image processing, such as distortion correction, white balance adjustment, and color interpolation processing, to digital image data output by analog-to-digital (A/D) conversion, and outputs resulting digital image data. The digital image data output from the image processing unit 207 is converted into a recording format, such as a Joint Photographic Experts Group (JPEG), by an image recording unit 208, and the recording format is transmitted to a memory 215 and a video output unit 217 to be described below.

A lens barrel rotation driving unit 205 drives the tilt rotation unit 104 and the pan rotation unit 105 to drive the lens barrel 102 in a tilt direction and a pan direction.

An apparatus shake detection unit 209 incorporates, for example, an angular velocity meter (gyroscope sensor) 106 for detecting an angular velocity in three axial directions of the image capturing apparatus 101, and an accelerometer (acceleration sensor) 107 for detecting accelerations in three axial directions of the image capturing apparatus 101. The apparatus shake detection unit 209 calculates the rotation angle of the image capturing apparatus 101, the amount of shift of the image capturing apparatus 101, or the like based on detected signals.

An audio input unit 213 acquires an audio signal obtained near the image capturing apparatus 101 from a microphone provided on the image capturing apparatus 101, performs a analog-to-digital conversion on the audio signal, and the converted audio signal to an audio processing unit 214. The audio processing unit 214 performs audio processing, such as optimization processing, on the received digital audio signal. The audio signal processed by the audio processing unit 214 is transmitted to the memory 215 by the first control unit 223. The memory 215 temporarily stores image signals acquired by the image processing unit 207 and audio signals acquired by the audio processing unit 214.

The image processing unit 207 and the audio processing unit 214 read out the image signals and audio signals temporarily stored in the memory 215, encode the image signals and audio signals, and generate a compressed image signal and a compressed audio signal, respectively. The first control unit 223 transmits the compressed image signal and the compressed audio signal to a recording/playback unit 220.

The recording/playback unit 220 records the compressed image signal and the compressed audio signal generated by the image processing unit 207 and the audio processing unit 214, respectively, other control data on image capturing, and the like on a recording medium 221. In a case where audio signals are not compressed and encoded, the first control unit 223 transmits the audio signal generated by the audio processing unit 214 and the compressed image signal generated by the image processing unit 207 to the recording/playback unit 220 and records the audio signal and the compressed image signal on the recording medium 221.

The recording medium 221 may be a recording medium incorporated in the image capturing apparatus 101, or may be a detachable recording medium. The recording medium 221 can record various data, such as the compressed image signal, the compressed audio signal, and the audio signal generated by the image capturing apparatus 101. A recording medium having a capacity larger than that of the nonvolatile memory 216 is generally used as the recording medium 221. Examples of the recording medium 221 include any type of recording media, such as a hard disk, an optical disk, a magneto-optical disk, a compact disc recordable (CD-R), a digital versatile disc (DVD)-R, a magnetic tape, a nonvolatile semiconductor memory, and a flash memory.

The recording/playback unit 220 reads out (plays back) the compressed image signal, the compressed audio signal, the audio signal, various data, and programs recorded on the recording medium 221. The first control unit 223 transmits the read compressed image signal and the read compressed audio signal to the image processing unit 207 and the audio processing unit 214, respectively. The image processing unit 207 and the audio processing unit 214 temporarily store the compressed image signal and the compressed audio signal on the memory 215, decode the signals in a predetermined procedure, and transmit the decoded signals to the video output unit 217 and an audio output unit 218, respectively.

The audio input unit 213 includes a plurality of microphones incorporated in the image capturing apparatus 101, and the audio processing unit 214 can detect a sound direction on a plane where the plurality of microphones is installed and is used for search and automatic image capturing processing described below. The audio processing unit 214 detects specific audio commands Preliminarily registered commands may be used as the audio commands, or a user may register specific sound in the image capturing apparatus 101. The audio processing unit 214 also recognizes a sound scene. In the sound scene recognition, a sound scene is determined by a network learned by machine learning using a large amount of audio data. For example, a network for detecting a specific scene, such as "cheering", "applause", or "someone is letting out his/her voice", is set in the audio processing unit 214. When the specific sound scene or the specific audio command is detected, a detection trigger signal is output to the first control unit 223.

A power supply unit 210 supplies power for operating the first control unit 223. The audio output unit 218 outputs a preset audio pattern from a speaker incorporated in the image capturing apparatus 101, for example, during image capturing.

A light-emitting diode (LED) control unit 224 controls a preset lighting or blinking pattern for an LED provided in the image capturing apparatus 101, for example, during image capturing.

The video output unit 217 includes, for example, a video image output terminal, and transmits an image signal for displaying a video image on a connected external display or the like. The audio output unit 218 and the video output unit 217 may be coupled as a single terminal, such as a High-Definition Multimedia Interface (HDMI®) terminal.

A learning processing unit 219 performs learning based on user's preference using a machine learning algorithm with a neural network.

A communication unit 222 performs a communication between the image capturing apparatus 101 and an external apparatus. The communication unit 222 transmits and receives data, such as an audio signal, an image signal, a compressed audio signal, or a compressed image signal. The communication unit 222 receives an image capturing start command, an image capturing termination command, and a control signal for image capturing to control, for example, pan, tilt, and zoom driving, and drives the image capturing apparatus 101 in response to an instruction from the external apparatus configured to communicate with the image capturing apparatus 101. Information, such as various parameters for learning to be processed by the learning processing unit 219, is transmitted and received between the image capturing apparatus 101 and the external apparatus. The communication unit 222 is, for example, a wireless communication module, such as an infrared communication module, a Bluetooth® communication module, a wireless local area network (LAN) communication module, a wireless universal serial bus (USB), or a global positioning system (GPS) receiver.

<Configuration of Automatic Image Capturing System including Plurality of Apparatuses Working Together>

Figure 3:
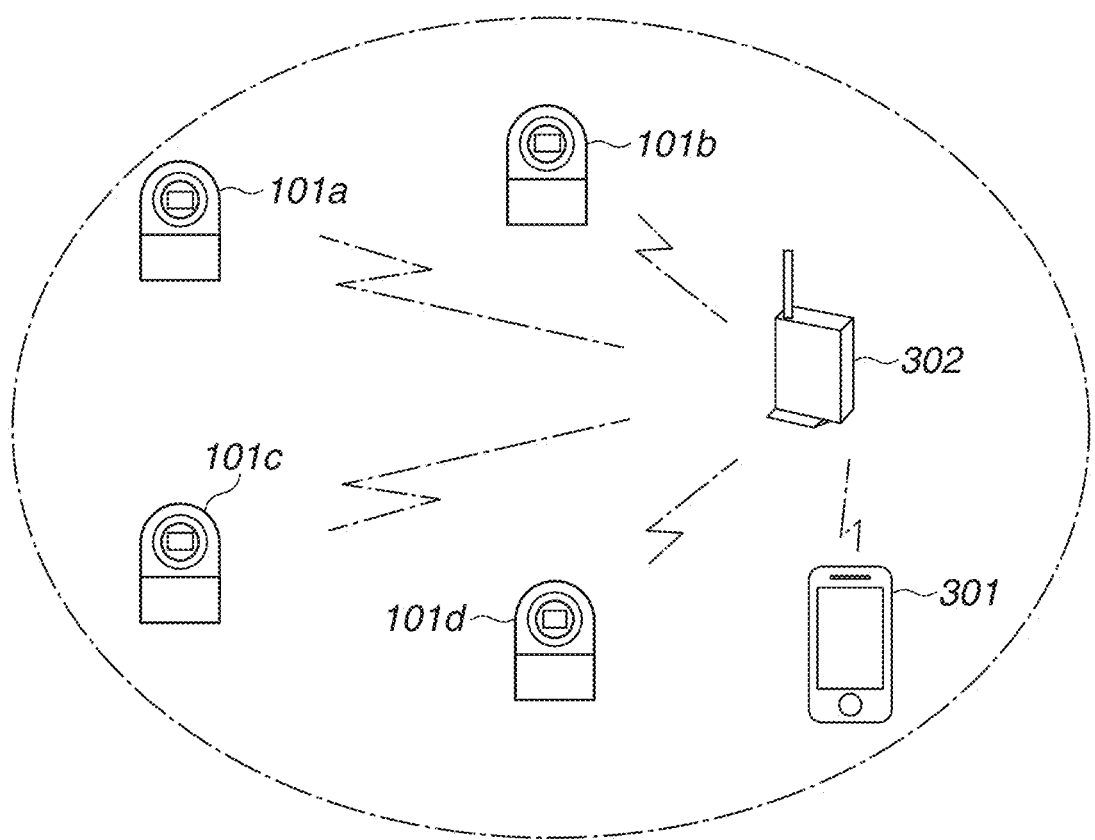
FIG. 3 is a diagram illustrating a system configuration including a plurality of image capturing apparatuses and an external apparatus according to the first exemplary embodiment.

FIG. 3 illustrates an example of an automatic image capturing system (control system) in which a plurality of image capturing apparatuses works in conjunction with each other.

Image capturing apparatuses (101a, 101b, 101c, and 101d) are each connected to a controller (smart device) 301, which includes a communication function, by wireless communication, and therefore each of the image capturing apparatuses is capable of sending an operation instruction to the other image capturing apparatuses and acquiring control information supplied from the other image capturing apparatuses. In the configuration illustrated in FIG. 3, the image capturing apparatuses (101a, 101b, 101c, and 101d) and the smart device 301 are each connected to an access point 302 to communicate with each other via the access point 302 and transfer information.

Figure 4:
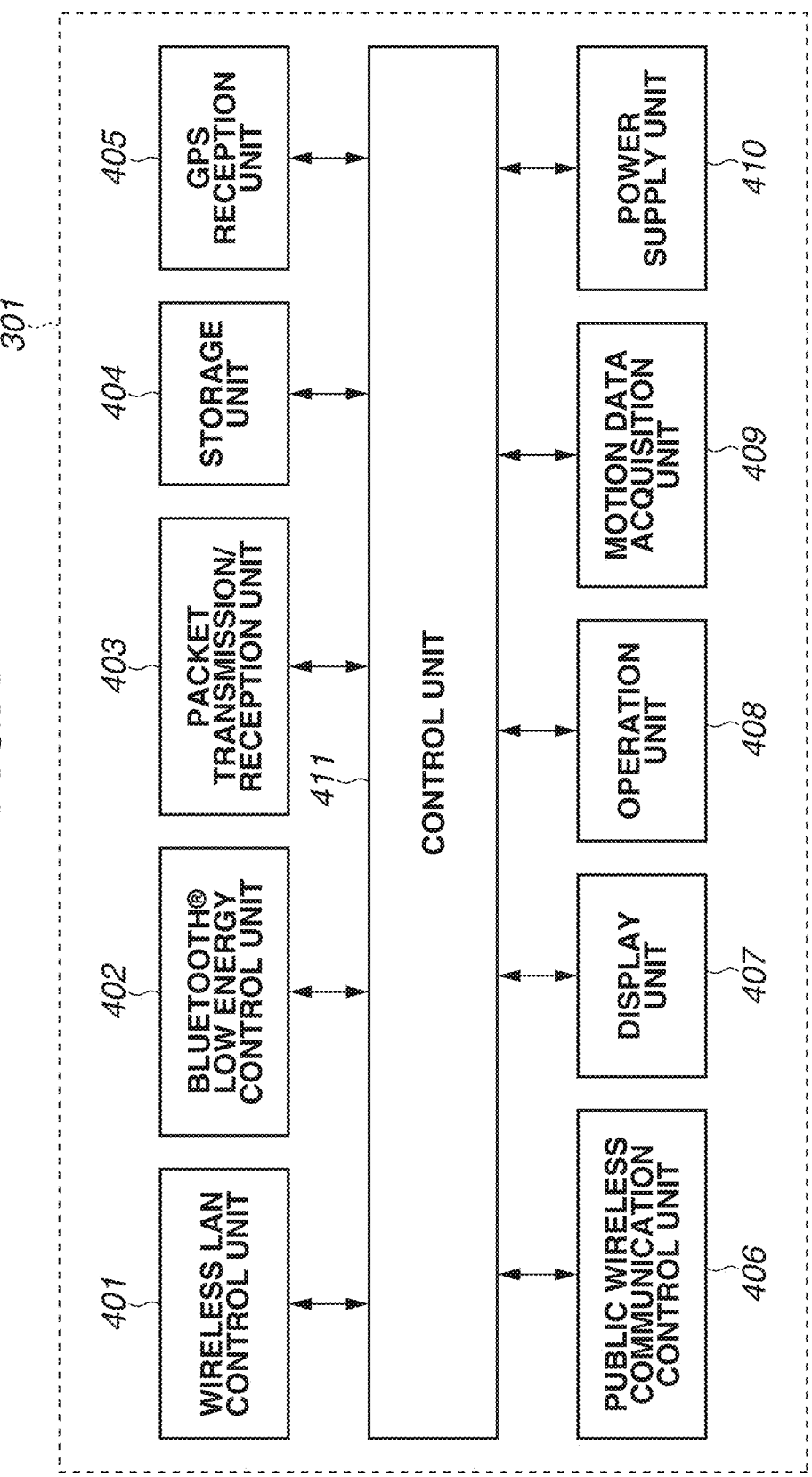
FIG. 4 is a block diagram illustrating a configuration of the external apparatus according to the first exemplary embodiment.

A configuration example of the smart device 301 including a wireless LAN communication module will be described with reference to FIG. 4

The smart device 301 is, for example, an information processing apparatus which includes a wireless LAN control unit 401 for wireless LAN, a Bluetooth® Low Energy control unit 402 for Bluetooth® Low Energy, and a public wireless communication control unit 406 for public wireless communication. The smart device 301 further includes a packet transmission/reception unit 403. The wireless LAN control unit 401 performs wireless LAN radio frequency (RF) control, communication processing, and protocol processing for drivers that is used to perform various control processing on wireless LAN communication based on Institute of Electrical and Electronics Engineers (IEEE) 802.11 standard series and for wireless LAN communication. The Bluetooth® Low Energy control unit 402 performs Bluetooth® Low Energy RF control, communication processing, and protocol processing for drivers that is used to perform various control processing by Bluetooth® Low Energy and for communication by Bluetooth® Low Energy. The public wireless communication control unit 406 performs public wireless communication RF control, communication processing, and protocol processing for drivers that is used to perform various control processing for public wireless communication and for public wireless communication. The public wireless communication are based on, for example, International Multimedia Telecommunications (IMT) standards or Long Term Evolution (LTE) standards. The packet transmission/reception unit 403 performs processing for executing at least one of transmission and reception of packets for communication by wireless LAN and Bluetooth® Low Energy and public wireless communication. The present exemplary embodiment illustrates an example where the smart device 301 performs at least one of transmission and reception of packets in communication. However, not only packet exchange, but also any other communication formats such as line switching may be used.

The smart device 301 further includes, for example, a control unit 411, a storage unit 404, a GPS reception unit 405, a display unit 407, an operation unit 408, a motion data acquisition unit 409, and a power supply unit 410. The control unit 411 controls the overall operation of the smart device 301 by, for example, executing a control program stored in the storage unit 404. The storage unit 404 stores, for example, control programs to be executed by the control unit 411 and various information, such as parameters for communication. Various operations to be described below are implemented by the control unit 411 executing the control programs stored in the storage unit 404.

The power supply unit 410 supplies power to the smart device 301. The display unit 407 includes a function, such as a liquid crystal display (LCD) or LED, which enables output of information that can be visually recognized, or a function, such as a speaker, which enables sound output, and displays various information. The operation unit 408 is, for example, a button for receiving a user's operation on the smart device 301. The display unit 407 and the operation unit 408 may be formed of, for example, a common member, such as a touch panel.

The motion data acquisition unit 409 incorporates, for example, an angular velocity meter (gyroscope sensor) for detecting an angular velocity in three axial directions of the smart device 301. The motion data acquisition unit 409 also incorporates an accelerometer (acceleration sensor) for detecting accelerations in three axial directions of the smart device 301, a compass (geomagnetic sensor) for detecting geomagnetism, or the like. The control unit 411 calculates a rotation angle or a displacement amount (XYZ-axis movement amount) of the smart device 301 based on output values from the gyroscope sensor, the acceleration sensor, and the geomagnetic sensor. In addition, an air pressure sensor may be provided to acquire an altitude based on a change in air pressure, and the acquired altitude can be used to detect a movement amount.

The GPS reception unit 405 receives a GPS signal sent from a satellite, analyzes the GPS signal, and estimates a current position (longitude/latitude information) of the smart device 301. Alternatively, the current position of the smart device 301 may be estimated using a Wireless Fidelity (Wi-Fi®) Positioning System (WPS), or the like based on information about wireless networks present in the vicinity of the smart device 301.

As described above, the image capturing apparatus 101 and the smart device 301 exchange data by communication using the wireless LAN control unit 401. For example, the smart device 301 transmits and receives data, such as an audio signal, an image signal, a compressed audio signal, and a compressed image signal to and from the image capturing apparatus 101, receives image capturing start information and subject detection information from the image capturing apparatus 101, and issues an instruction for operation, such as image capturing by the image capturing apparatus 101, to the image capturing apparatus 101.

In the configuration illustrated in FIG. 3, the smart device 301 is used as a controller for each of the image capturing apparatuses 101, and therefore the smart device 301 serves as a server to transmit and receive information to and from the image capturing apparatuses 101 (101a, 101b, 101c, and 101d) via the access point 302. Alternatively, the plurality of image capturing apparatuses may be controlled by a different method.

Figure 6:
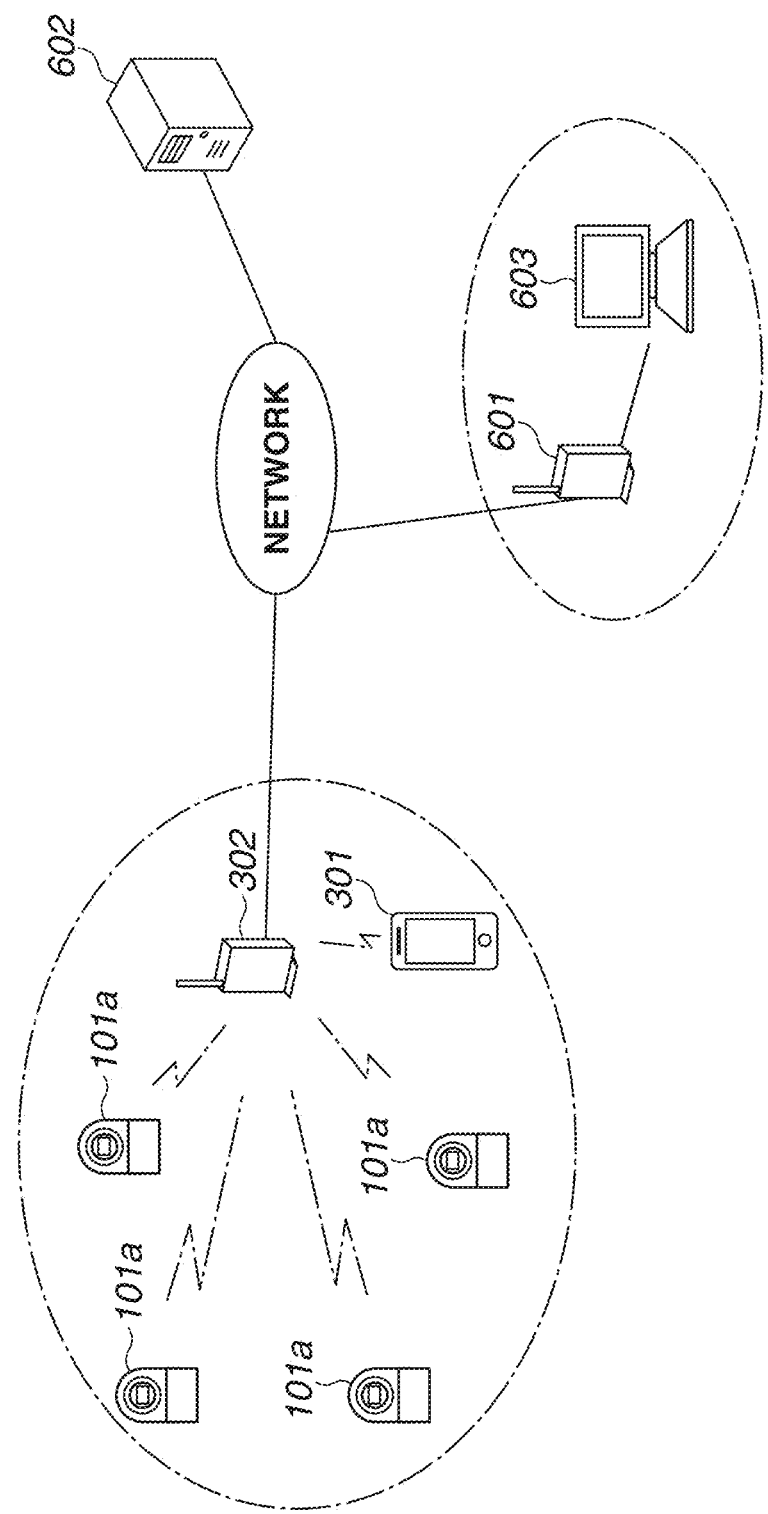
FIG. 6 is a diagram illustrating a system configuration including the plurality of image capturing apparatuses and a smart device according to the first exemplary embodiment.
Figure 7:
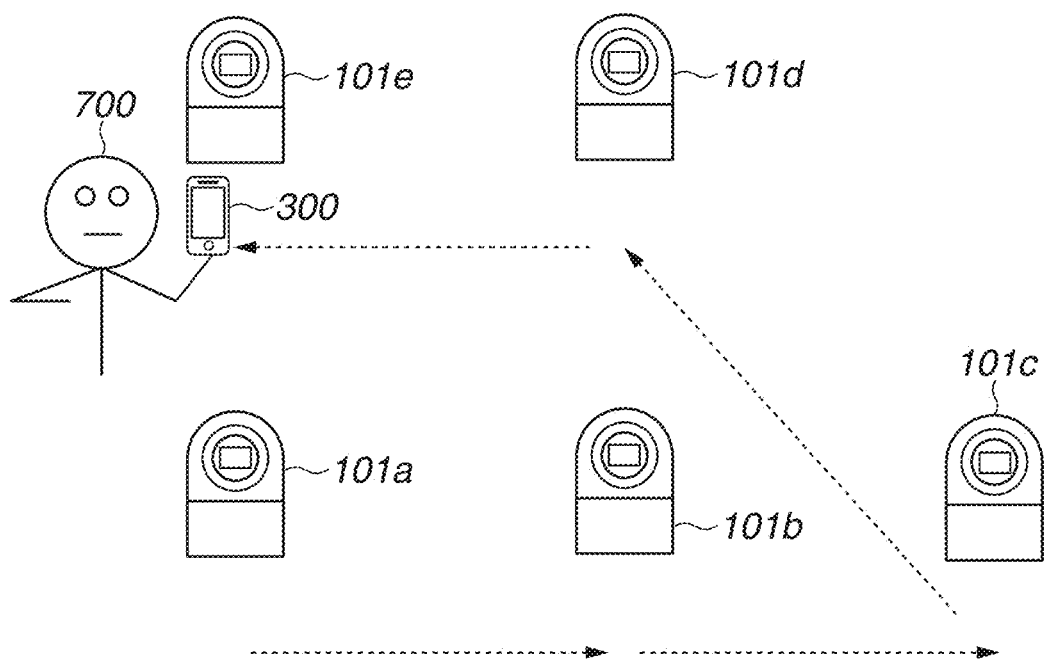
FIG. 7 is a diagram illustrating a method for setting the image capturing apparatuses according to the first exemplary embodiment.

FIG. 6 illustrates an example of data transfer via a server. The image capturing apparatuses 101 (101a, 101b, 101c, and 101d) are wirelessly connected to a server 602 via the access point 302 and transfer information. A personal computer (PC) 603 is connected to the server via an access point 601, and acquires information transferred to the server from the image capturing apparatuses 101 (101a, 101b, 101c, and 101d). In this example, the image capturing apparatuses 101 and the PC 603 are connected to the server via different access points, respectively, but instead may be connected via the same access point. The connection to be established between the PC 603 and the server is not limited to a wireless connection, but instead may be a wired connection.

The connection between the image capturing apparatuses 101 is not limited to a wireless connection, but instead may be a wired connection. The image capturing apparatuses 101 may be configured to operate while power is supplied using Power over Ethernet (PoE).

<Image Capturing Apparatus Layout Setting Method>

Consider a case where the plurality of image capturing apparatuses 101 is installed in a fixed manner and the image capturing apparatuses 101 work in conjunction with each other to perform automatic framing and image capturing while driving and controlling the tilt rotation unit 104, the pan rotation unit 105, and the zoom unit 201. In this case, it may be desirable to recognize layout information about the image capturing apparatuses 101 and angular information in the orientation of an optical axis of each of the image capturing apparatuses 101.

A method for acquiring the installation layout and an angle of each of the image capturing apparatuses 101 by a simple method will be described.

A dedicated application for controlling the plurality of image capturing apparatuses is installed in the smart device 301. The user uses the application to register installation positions of the image capturing apparatuses 101 by a simple method, whereby the plurality of image capturing apparatuses 101 can perform framing control by working in conjunction with each other during image capturing.

Figure 8:
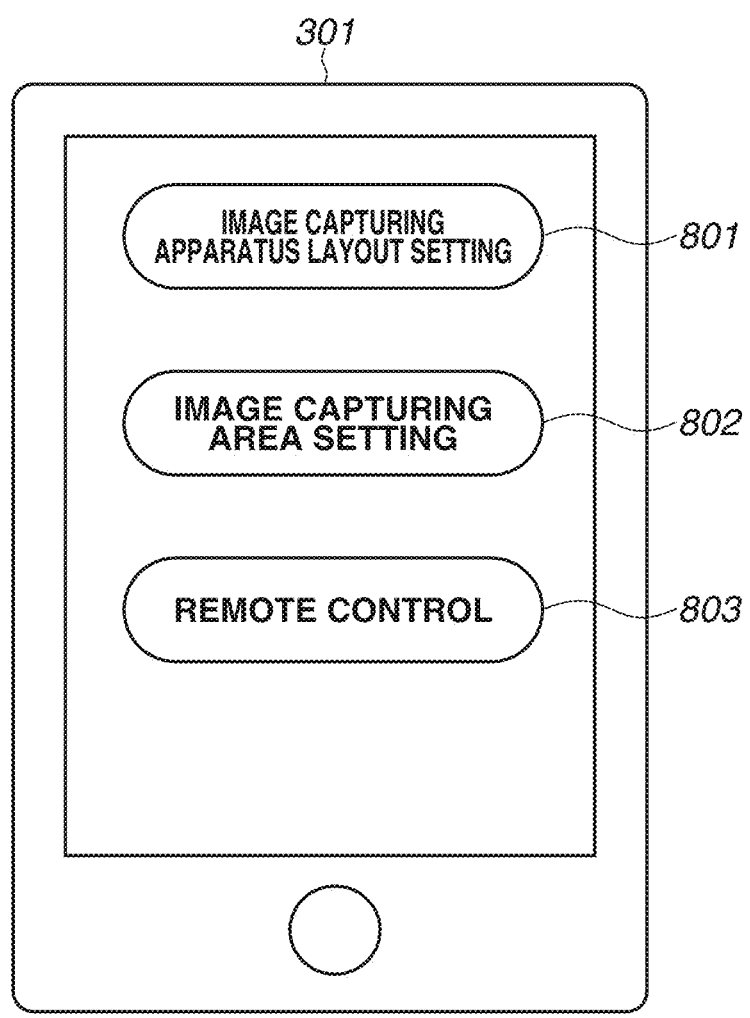
FIG. 8 is a diagram illustrating the application according to the first exemplary embodiment.
Figure 9:
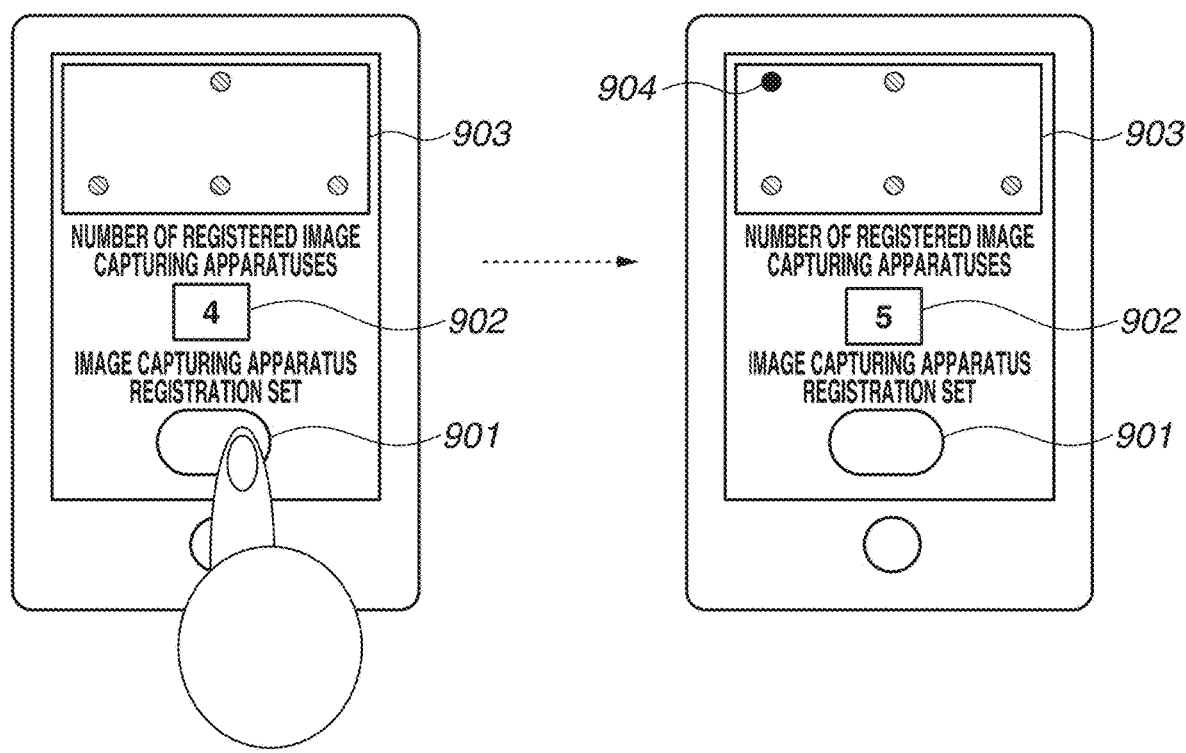
FIG. 9 is a diagram illustrating an image capturing area setting for the application according to the first exemplary embodiment.

First, image capturing apparatuses 101a, 101b, 101c, 101d, and 101e are each installed in an appropriate position. A user 700 starts the application in the smart device 301. FIG. 8 illustrates an example of a screen that is displayed when the application is started. An image capturing apparatus layout setting tab 801 is tapped to shift the screen to an image capturing apparatus layout setting screen. FIG. 9 illustrates an example of the image capturing apparatus layout setting screen. The user 700 moves to the position where the image capturing apparatus 101a is installed and brings the smart device 301 in the proximity of the image capturing apparatus 101a as close to each other as possible, and then taps an image capturing apparatus registration set button 901 (FIG. 9). Similarly, the user 700 moves to the positions where the image capturing apparatuses 101b, 101c, 101d, and 101e are installed, respectively, and brings the smart device 301 in the proximity of the image capturing apparatuses 101b, 101c, 101d, and 101e as close to each other as possible, and then taps the image capturing apparatus registration set button 901 to acquire layout information about each of the image capturing apparatuses 101. The registered installation positions of the image capturing apparatuses can be checked on a display portion 903, and the layout positions of the image capturing apparatuses as viewed from above in a gravitational direction are displayed in default settings.

An example where the user moves from the position of the image capturing apparatus 101d to the position of the image capturing apparatus 101e and the image capturing apparatuses 101 are registered will now be described. Since the image capturing apparatuses 101a, 101b, 101c, and 101d has been registered when the image capturing apparatus 101d is registered, the number of registered image capturing apparatuses is four, and thus "4" is displayed in a "number of registered image capturing apparatuses" area 902. When the user moves to the position of the image capturing apparatus 101e and taps the image capturing apparatus registration set button 901, the number in the "number of registered image capturing apparatuses" area 902 changes from "4" to "5". An "image capturing position" 904 of the image capturing apparatus 101e is additionally displayed on the display portion 903 as the installation position of the image capturing apparatus 101e.

A method for displaying the position of each of the image capturing apparatuses 101 when the installation positions of the image capturing apparatus 101 is displayed on the display portion 903 will be described in detail.

First, in a case where the image capturing apparatus registration set button 901 is tapped at a position closest to the first image capturing apparatus 101a, XYZ coordinates (0, 0, 0) of the position are first registered. Then, the user moves to the installed position of a next image capturing apparatus, and registers the next image capturing apparatus. In this case, a movement distance from a position based on the first registered coordinates (0, 0, 0) to a position where the image capturing apparatus registration set button 901 is subsequently tapped is calculated by a gyroscope sensor, an acceleration sensor, an azimuth sensor, or the like in the smart device 301, and the layout position is registered. Alternatively, information from a GPS provided in the smart device 301 may be used, or a GPS may be provided in each image capturing apparatus. Yet alternatively, a movement position may be detected by a method of estimating the current position by three-point positioning based on a difference between intensities of radio waves received from a plurality of wireless communications.

The angle of each of the image capturing apparatuses 101 is calculated based on results from an acceleration sensor and an azimuth sensor in the image capturing apparatuses 101.

Figure 10A:
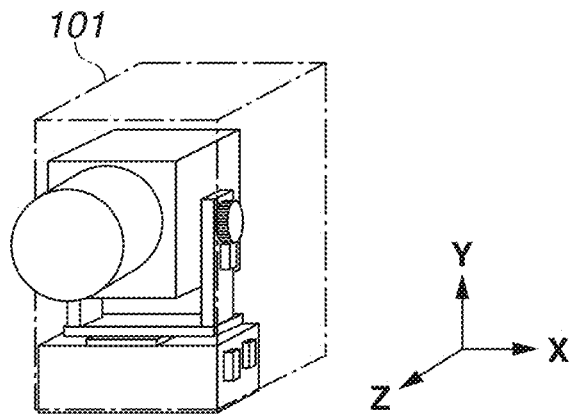
FIG. 10A is a diagram illustrating an image capturing area setting for the application according to the first exemplary embodiment.
Figure 10C:
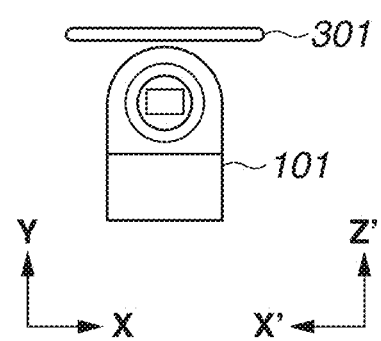
FIG. 10C is a diagram illustrating an image capturing area setting for the application according to the first exemplary embodiment.
Figure 10B:
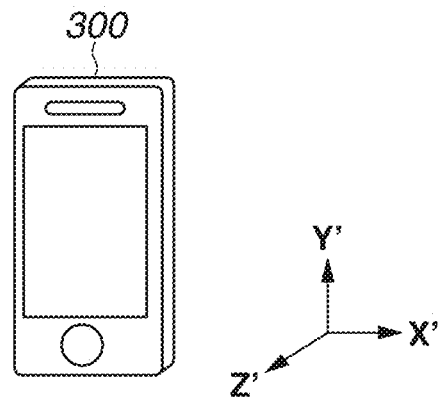
FIG. 10B is a diagram illustrating an image capturing area setting for the application according to the first exemplary embodiment.
Figure 10D:
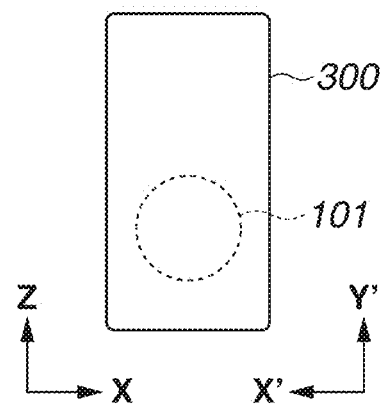
FIG. 10D is a diagram illustrating an image capturing area setting for the application according to the first exemplary embodiment.

Alternatively, the angle of each of the image capturing apparatuses 101 may be calculated based on results from the acceleration sensor and the azimuth sensor in the smart device 301, on the precondition that the user registers and sets, as a predetermined angle position, a relative angle between the smart device 301 and each of the image capturing apparatuses 101. An X-axis, a Y-axis, and a Z-axis of the image capturing apparatuses 101 are defined as illustrated in FIG. 10A, and an X'-axis, a Y'-axis, and a Z'-axis of the smart device 301 are defined as illustrated in FIG. 10B. As illustrated in FIGS. 10C and 10D, pan and tilt angles of the image capturing apparatuses 101 are set in such a manner that the optical axis direction (Z-direction) at a default position matches the angle of the smart device 301 in a Y'-direction, and then the image capturing apparatus layout setting tab 801 is tapped to set the position and angle of each of the image capturing apparatuses 101. This eliminates the need for incorporating an azimuth sensor in each image capturing apparatus, and enables acquisition of the azimuth angle of each of the image capturing apparatuses 101 by using sensor information in the smart device 301.

By the above-described method, the three-axis angle of each of the image capturing apparatuses 101 can be calculated.

Figure 11:
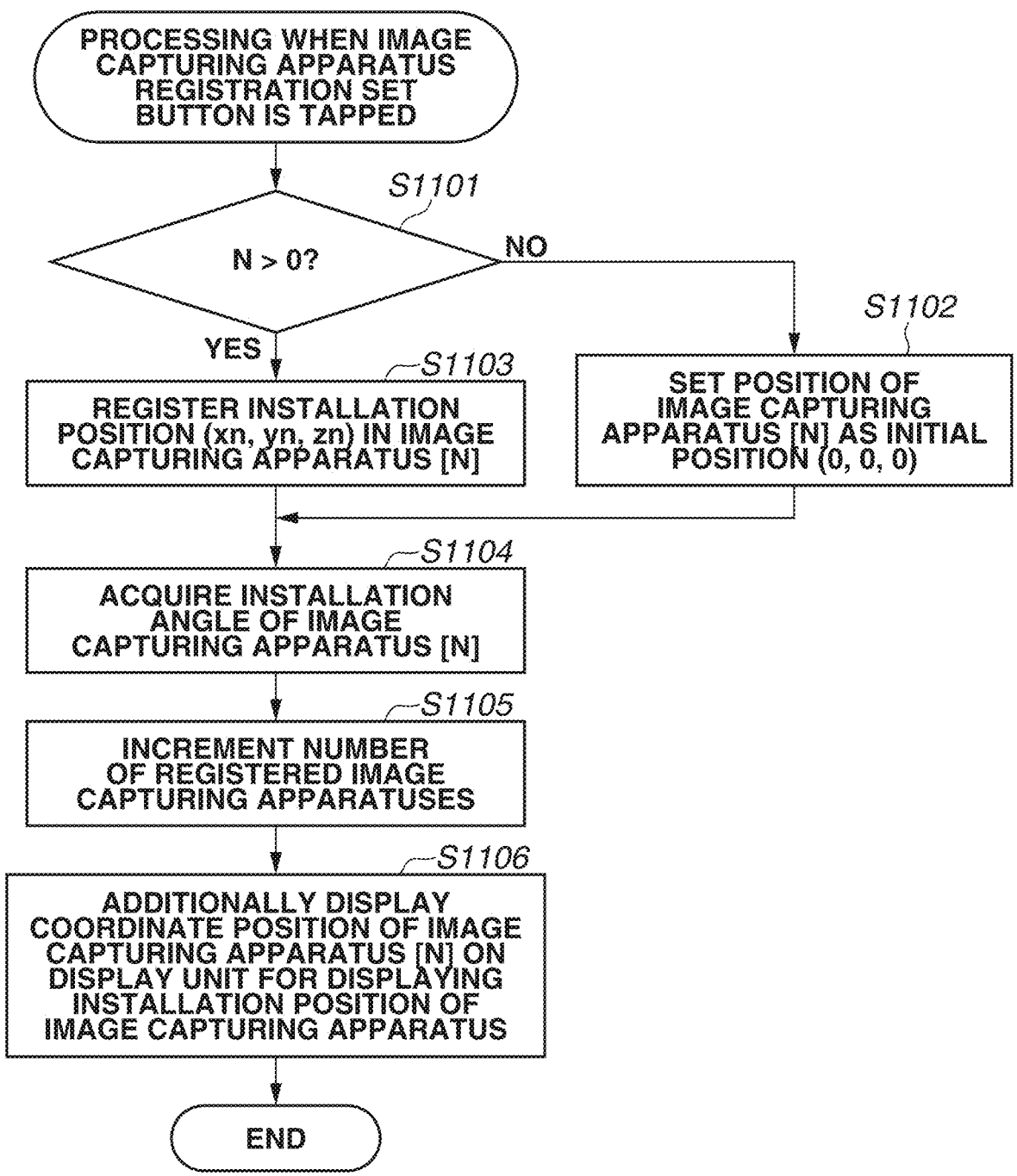
FIG. 11 is a flowchart illustrating the image capturing area setting for the application according to the first exemplary embodiment.

FIG. 11 is a flowchart illustrating a processing procedure for the control unit 411 of the smart device 301 after the image capturing apparatus registration set button 901 is tapped.

In step S1101, it is determined whether the number of registered image capturing apparatuses (N) is greater than "0". In a case where N is less than or equal to "0" (that is, the number of registered image capturing apparatuses is "0") (NO in step S1101), the processing proceeds to step S1102. In step S1102, the image capturing apparatus position of the image capturing apparatus [N] (image capturing apparatus 101a) is first registered as the initial position (0, 0, 0). In step S1101, in a case where N is greater than "0" (YES in step S1101), the processing proceeds to step S1103. In step S1103, a relative position from the position set as an (N−1)th image capturing apparatus [N−1] to the current position is calculated to set the coordinates of the N-th image capturing apparatus [N], and the installation position of the image capturing apparatus [N] is registered.

After the processing of steps S1102 and S1103, the processing proceeds to step S1104. In step S1104, the installation angle of the image capturing apparatus [N] is acquired, and then the processing proceeds to step S1105. In step S1105, the number of registered image capturing apparatuses is incremented and the display of the number of image capturing apparatuses on the "number of registered image capturing apparatuses" area 902 is updated, and then the processing proceeds to step S1106. In step S1106, the coordinate position of the image capturing apparatus [N] is additionally displayed on the display portion 903 for displaying the installation position of the image capturing apparatuses 101, and then the processing is terminated.

This processing procedure is repeated every time the image capturing apparatus registration set button 901 is tapped. In a case where the registration is reset by a reset setting or the like, which is provided separately, the number of registered image capturing apparatuses N is reset to "0" and information to be displayed on the display portion 903 for displaying the installation position of the image capturing apparatuses 101 is also reset.

<Image Capturing Area Setting Method>

Figure 12A:
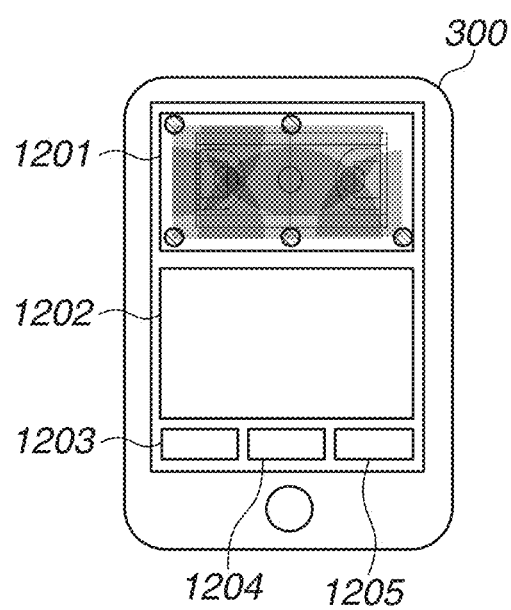
FIG. 12A is a diagram illustrating a display example of an image capturing area check mode of the application according to the first exemplary embodiment.
Figure 12B:
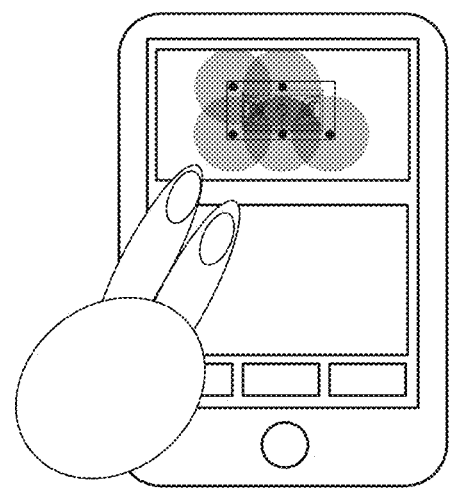
FIG. 12B is a diagram illustrating a display example of an image capturing area check mode of the application according to the first exemplary embodiment.
Figure 12C:
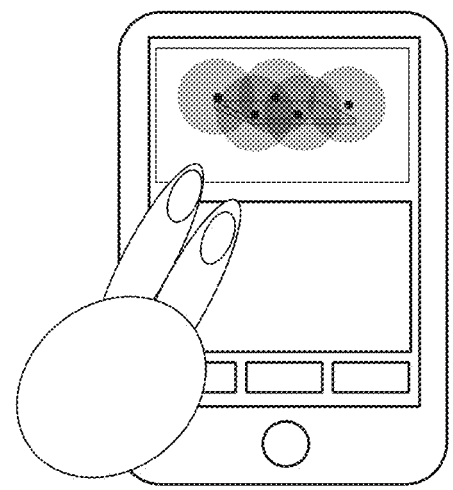
FIG. 12C is a diagram illustrating a display example of an image capturing area check mode of the application according to the first exemplary embodiment.

In a case where the screen is returned to a screen illustrated in FIG. 8 and the user 700 taps an image capturing area setting tab 802, the screen is shifted to an image capturing area setting screen. FIGS. 12A to 12C each illustrate an example of the image capturing area setting screen. On a display portion 1201 for displaying the installation positions of the image capturing apparatuses 101, the layout of the image capturing apparatuses 101 set on the above-described image capturing apparatus layout setting screen is displayed. As illustrated in FIGS. 12A to 12C, the user may attach an illustration on the display screen, or may add a separately prepared image captured from above and on the display screen (FIGS. 12A to 12C each illustrate an example of a basketball court). An area 1202 displays an actual live video image captured by the image capturing apparatus. In a case where the installation position of the image capturing apparatus on the display portion 1201 is tapped, the live display for the designated image capturing apparatus can be performed. Buttons 1203, 1204, and 1205 are prepared for changing the respective modes. The image capturing area check mode button 1203, the entire image capturing area setting mode button 1204, and the individual image capturing area setting mode button 1205 are disposed as mode switches for shifting the screen to the respective modes.

An "image capturing area check mode" will now be described.

<Image Capturing Area Check Mode>

When the area corresponding to the image capturing area check mode button 1203 is tapped, the screen is shifted to an "image capturing area check mode" screen (FIGS. 12A to 12C).

As described above, the layout of the image capturing apparatuses is displayed on the display portion 1201. In the case where an image capturing area is not set by the user in the "entire image capturing area setting mode" and "individual image capturing area setting mode" to be described below, the entire area to be captured by each of the image capturing apparatuses 101 using driving the tilt rotation unit 104, the pan rotation unit 105, and the zoom unit 201 is displayed. The depth of a displayed color increases with increasing the number of image capturing areas overlapping each other, each of which is captured by a different one of the plurality of image capturing apparatuses 101, and the depth of a displayed color decreases with decreasing the number of the image capturing areas overlapping each other, each of which is captured by a different one of the plurality of image capturing apparatuses 101. Based on a maximum focal length of each of the image capturing apparatuses 101, the range of the image capturing area is determined using the position of each of the image capturing apparatuses 101 as an origin. Specifically, the range of the image capturing area is determined based on a condition that an image capturing magnification at the maximum zoom position is more than or equal to a predetermined value, and a radius from the layout position of each image capturing apparatus is determined. The above-described display enables the user to check an area where a multi-viewpoint video image can be captured by the plurality of image capturing apparatuses 101, and check an area or the like where image capturing cannot be easily performed by the plurality of image capturing apparatuses 101.

The display portion 1201 for displaying the installation position of each o the image capturing apparatuses 101 enables the screen to be enlarged or reduced and rotated. When an operation (pinch-in) to pinch the touch screen with two fingers is performed on the display portion 1201, the screen is reduced, and therefore the user 70 can check the screen with a wider area. When an operation (pinch-out) to move two fingers away from each other on the touch screen is performed on the display portion 1201, the screen is enlarged, and thereofor the user can check the image capturing area (FIGS. 12A and 12B illustrate an example of transition of the display during pinch-in operation). When an operation to slide the touch screen with two fingers in the same direction is performed on the display portion 1201, the angle of the screen display can be changed. For example, when a slide operation is performed in a vertical direction, the screen can be rotated with a horizontal axis of the screen as a rotation axis, and when a slide operation is performed in a horizontal direction, the screen can be rotated with a vertical axis of the screen as a rotation axis (FIG. 12C illustrates an example of the display).

A live video image captured by the designated image capturing apparatus can be displayed by moving the central position on the screen by a slide operation with one finger, or by tapping the image capturing apparatus layout area.

<Entire Image Capturing Area Setting Mode>

When the entire image capturing area setting mode button 1204 is tapped, the screen is shifted to an "entire image capturing area setting mode" screen (FIGS. 13A to 13F).

Figure 13A:
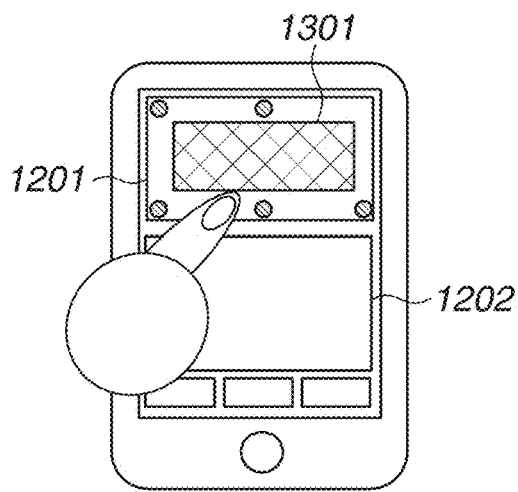
FIG. 13A is a diagram illustrating a display example of an entire image capturing area setting mode of the application according to the first exemplary embodiment.

In the "entire image capturing area setting mode", the user manually operates the image capturing area on the screen displayed on the display portion 1201 displaying the installation position of each of the image capturing apparatuses 101, and therefore the user can obtain a desired video image when the plurality of image capturing apparatuses 101 performs automatic framing and image capturing. In this case, in an area that is not designated as the image capturing area, the image capturing apparatuses 101 are automatically controlled to hardly perform image capturing in the area. An image capturing area 1301 illustrated in FIG. 13A is an example of the image capturing area designated by the user within the display screen on the display portion 1201 for displaying the installation position of each image capturing apparatus.

An area 1302 and an area 1303 are displayed to enable the user to visually recognize that the area 1302 and the area 1303 are different areas in the area designated as the image capturing area by the user. In this case, in a case where an area is determined as an image capturing coverage area in which image capturing can be performed by the image capturing apparatuses 101, the area is displayed like the area 1302, and in a case where an area is determined not as the image capturing coverage area, the area is displayed like the area 1303. As illustrated in FIGS. 12A to 12C, in a case where an area is far from the image capturing apparatuses 101, or an area is not covered by two or more image capturing apparatuses 101 having image capturing areas not overlapping each other, the area is determined to be an area outside of the image capturing coverage.

Figure 13D:
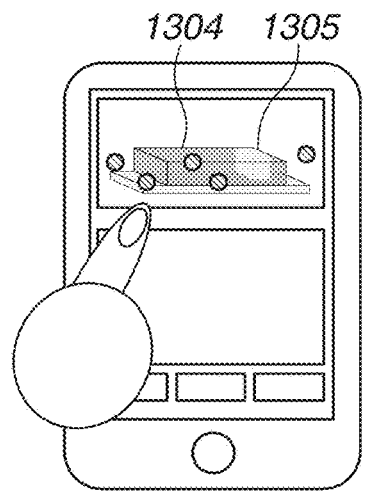
FIG. 13D is a diagram illustrating a display example of an entire image capturing area setting mode of the application according to the first exemplary embodiment.
Figure 13B:
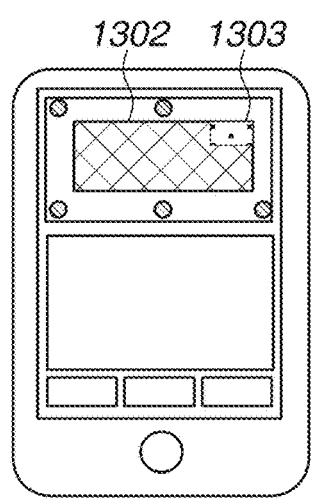
FIG. 13B is a diagram illustrating a display example of an entire image capturing area setting mode of the application according to the first exemplary embodiment.
Figure 13E:
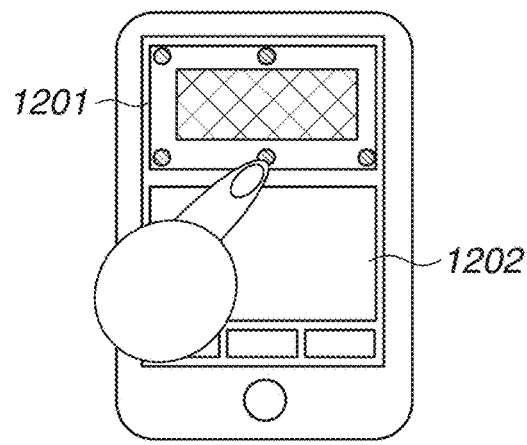
FIG. 13E is a diagram illustrating a display example of an entire image capturing area setting mode of the application according to the first exemplary embodiment.
Figure 13C:
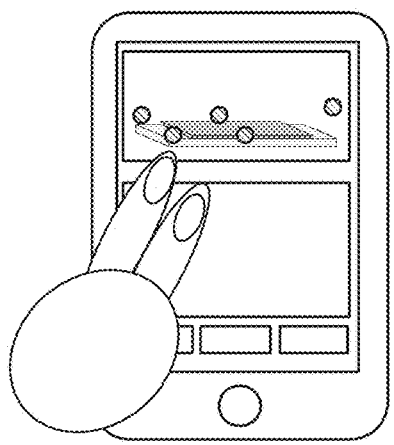
FIG. 13C is a diagram illustrating a display example of an entire image capturing area setting mode of the application according to the first exemplary embodiment.

In the same manner as described above with reference to FIGS. 12A to 12C, the screen in the display portion 1201 for displaying the installation position of each of the image capturing apparatuses 101 can be enlarged or reduced and rotated. When an operation (pinch-in) to pinch the touch screen with two fingers is performed on the display portion 1201, the screen is reduced, and therefore the user can check the screen with a wider area. When an operation (pinch-out) to move two fingers away from each other is performed on the display portion 1201, the screen is enlarged, and therefore the user can check the image capturing area. When an operation to slide the touch screen with two fingers in the same direction is performed on the display portion 1201, the angle of the screen display can be changed. For example, when a slide operation is performed in the vertical direction, the screen can be rotated with the horizontal axis of the screen as a rotation axis, and when a slide operation is performed in the horizontal direction, the screen can be rotated with the vertical axis of the screen as a rotation axis (FIG. 13C illustrates an example of this display). With the Z-axis defined in the gravitational direction, the user can designate the image capturing area in the XY-axis range as illustrated in FIGS. 13A and 13B in a case where the screen is displayed in the Z-axis direction and can check whether the designated area is the image capturing coverage area. In this operation, the image capturing range in the Z-axis direction can also be designated. FIG. 13D illustrates an example where the user designates the image capturing area in the Z-axis direction in a state where the screen is rotated as illustrated in FIG. 13D and the angle of the screen is set to the angle at which the image capturing area in the Z-axis direction can be designated. In this operation, in a case where an area is determined as an image capturing coverage area where the image capturing apparatuses 101 can perform image capturing, the area is displayed like an area 1304, and in a case where an area is determined not as an image capturing coverage area, the area is displayed like an area 1305.

Figure 13F:
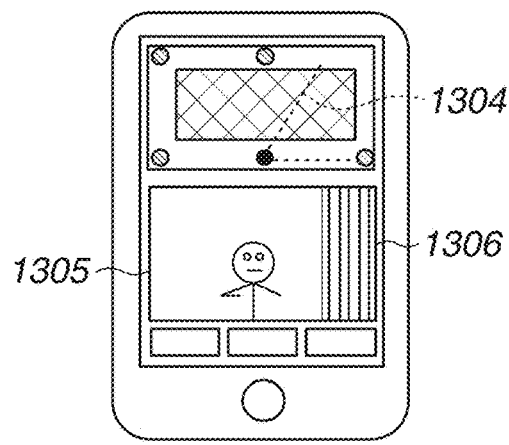
FIG. 13F is a diagram illustrating a display example of an entire image capturing area setting mode of the application according to the first exemplary embodiment.

The area 1202 is an area in which a live video image captured by the designated image capturing apparatus 101 is displayed. In a case where the installation position of the image capturing apparatus 101 is tapped on the display portion 1201 as illustrated in FIG. 13E, the live video image captured by the designated image capturing apparatus 101 is displayed on the area 1202. FIG. 13F illustrates an example of the display. The color, shape, or size of the designated image capturing apparatus 101 indicated in the display portion 1201 is changed, and therefore the user can check which image capturing apparatus is designated. The area 1304 indicating the range of the angle of view is simultaneously displayed to enable the user to recognize the current angle of view of display of the designated image capturing apparatus 101. In the live view displayed on the area 1202, the user can also recognize whether an area is within the range of the image capturing area 1301 that is designated by a user's manual operation, and thus the user can visually check the display (e.g., the area 1305 is in the designated image capturing area and an area 1306 falls outside the designated image capturing area and is displayed in gray).

In this manner, the user can designate the image capturing area with a simple operation, and the image capturing coverage area and an area other than the image capturing coverage area can be visualized. In addition, the user can check whether image capturing is performed in the range of the designated area, while monitoring the actual live video image captured by each image capturing apparatus.

<Individual Image Capturing Area Setting Mode>

When the individual image capturing area setting mode button 1205 is tapped, the screen is shifted to an "individual image capturing area setting mode" screen (FIGS. 14A to 14F).

Figure 14A:
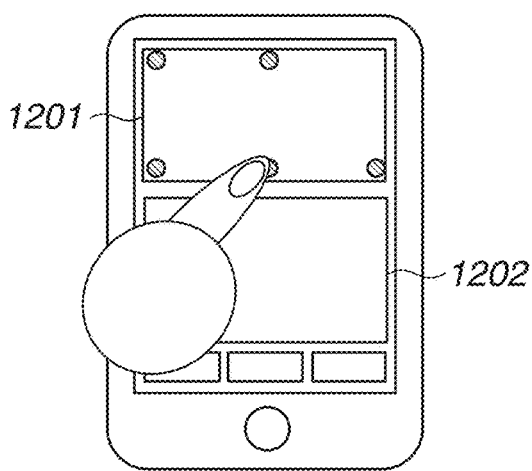
FIG. 14A is a diagram illustrating a display example of an individual image capturing area setting mode of the application according to the first exemplary embodiment.
Figure 14B:
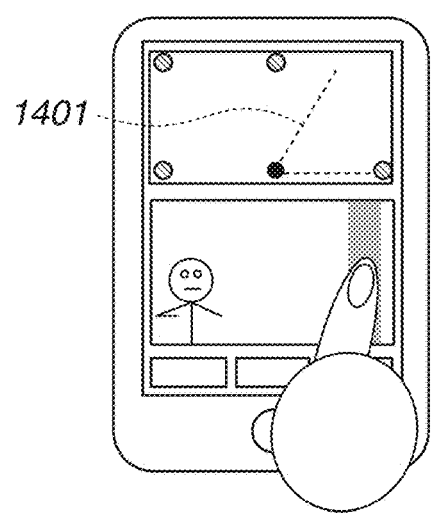
FIG. 14B is a diagram illustrating a display example of an individual image capturing area setting mode of the application according to the first exemplary embodiment.
Figure 14C:
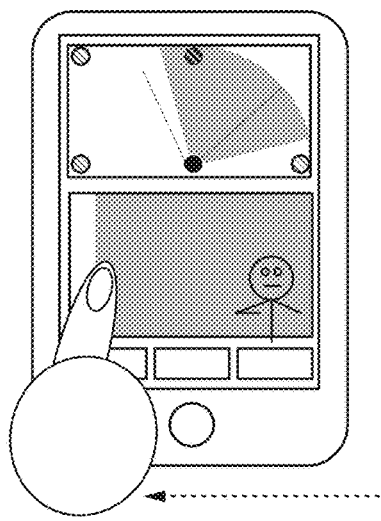
FIG. 14C is a diagram illustrating a display example of an individual image capturing area setting mode of the application according to the first exemplary embodiment.
Figure 14D:
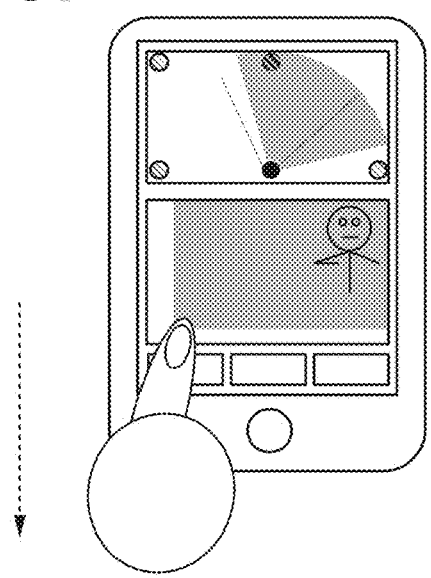
FIG. 14D is a diagram illustrating a display example of an individual image capturing area setting mode of the application according to the first exemplary embodiment.

In the "individual image capturing area setting mode", the detailed image capturing area can be designated for each of the image capturing apparatuses 101. As illustrated in FIG. 14A, in a case where the user taps the displayed position of the image capturing apparatus 101 for which the image capturing area is to be set on the screen displayed on the display portion 1201 for displaying the installation position of each of the image capturing apparatuses 101, the live video image captured by the designated image capturing apparatus 101 is displayed on the area 1202. FIG. 14B illustrates an example of the display. The color, shape, or size of the designated image capturing apparatus indicated in the display portion 1201 is changed, and therefore the user can visually check which image capturing apparatus 101 is designated. An area 1401 is simultaneously displayed to enable the user to recognize the range of the current angle of view of display of the designated image capturing apparatus 101. A slide operation performed on the touch screen with one finger on the screen on which the live video image is displayed on the area 1202 designates the image capturing area within the display screen. A touch slide operation in the lateral direction on the screen as illustrated in FIGS. 14B and 14C designates a range of the area. In a case where the touch position reaches a position near an end of the screen by a slide operation, pan driving for the designated image capturing apparatus 101 is performed in the lateral (pan) direction, and therefore the user can designate the image capturing area while changing the optical axis of the image capturing apparatus 101. A slide operation in the longitudinal (tilt) direction can also be performed in the same manner as described above, and a range of the area can be designated by a touch slide operation in the longitudinal direction on the screen as illustrated in FIGS. 14C and 14D. In a case where the touch position reaches a position near an end of the screen, tilt driving for the designated image capturing apparatus 101 is performed in the longitudinal (tilt) direction and the optical axis is changed, and therefore the user can easily designate the image capturing area. In a case where the user changes the optical axis of the image capturing apparatus 101 by the pan/tilt driving without designating the image capturing area, since the screen is configured to be movable in the longitudinal and lateral (tilt/pan) directions without designating the image capturing area, the user performs a touch slide operation with two fingers, for example. In a case where an operation (pinch-in) to pinch the touch screen with two fingers is performed on the display portion 1201, zoom driving is performed to increase the angle of view and the screen is reduced, and therefore the user can check the screen with a wider area. In a case where an operation (pinch-out) to move two fingers away from each other on the touch screen is performed on the display portion 1201, zoom driving is performed to decrease the angle of view and the screen is enlarged, and therefore the user can check the image capturing area.

The user may designate the area where zoom driving is automatically performed.

To cancel the designated image capturing area, for example, a message indicating "cancel?" is displayed on the screen by tapping the designated area twice. Then, "cancel OK" may be designated to cancel the designated area, or a touch button for "designate" and a touch button for "cancel" may be disposed on the touch screen and the area designated by a touch slide operation on the area 1202 is cancelled after "cancel" is designated.

Figure 14E:
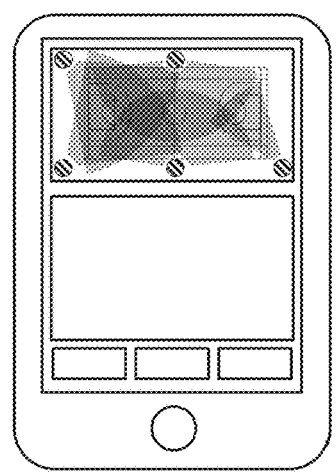
FIG. 14E is a diagram illustrating a display example of an individual image capturing area setting mode of the application according to the first exemplary embodiment.

By the above-described method, the image capturing area of each of the image capturing apparatuses 101 can be designated. When the image capturing area check mode button 1203 is tapped after the image capturing area for each of the image capturing apparatuses 101 is set on the "individual image capturing area setting mode" screen, the screen is shifted to the "image capturing area check mode" screen (as described above with reference to FIGS. 12A to 12C). FIG. 14E illustrates a display example of the image capturing area after the image capturing areas are individually designated by the method described above with reference to FIGS. 14A to 14D. Based on the image capturing area designated by each of the image capturing apparatuses 101, whether the area is in the image capturing coverage area can be visually checked by checking the depth of the color (the depth of the color increases with increasing the number of image capturing areas overlapping each other, each of which is captured by a different one of the plurality of image capturing apparatuses 101, and the depth of the color decreases with decreasing the number of image capturing areas overlapping each other, each of which is captured by a different one of the plurality of image capturing apparatuses 101).

Figure 14F:
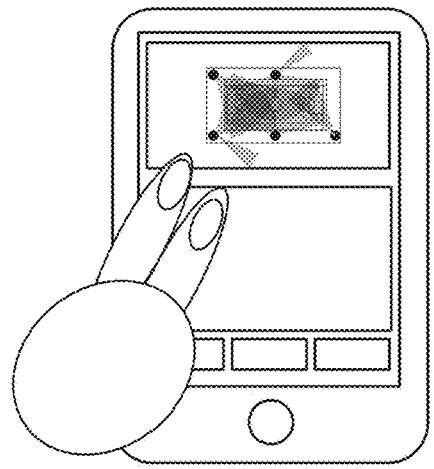
FIG. 14F is a diagram illustrating a display example of an individual image capturing area setting mode of the application according to the first exemplary embodiment.

FIGS. 14E and 14F each illustrate a display example during a pinch-in operation. The screen is reduced by a pinch-in operation, and therefore the user can check the image capturing area on the screen with a wider area.

As described above, designation of the image capturing area for each of the image capturing apparatuses 101 can be performed by the user with a simple operation, and the image capturing coverage area and an area other than the image capturing coverage area can also be visualized.

By the above-described method, an area to be captured by a plurality of image capturing apparatuses can be easily designated, and assistance can be provided for framing adjustment which is performed by the plurality of image capturing apparatuses working in conjunction with each other in the designated image capturing area and for automatic image capturing processing which is performed by the plurality of image capturing apparatuses focusing the designated image capturing area.

<Remote Control Setting Mode>

When the screen is returned to the screen illustrated in FIG. 8 and the user taps a remote control tab 803, the screen is shifted to a remote control screen. FIGS. 5A to 5D each illustrate an example of the remote control screen. In a display portion 1701, the installation position of each of the image capturing apparatuses 101 is displayed in such a manner that the layout of the image capturing apparatuses 101 set on the above-described image capturing apparatus layout setting screen and the image capturing area set on the image capturing area setting mode screen can be recognized. Visualization of the current orientation of each of the image capturing apparatuses 101 and the range of the angle of view of each of the image capturing apparatuses 101 is thus performed. In a case where the angle of view or the orientation of the optical axis of each of the image capturing apparatuses 101 is changed automatically or manually, the display of the orientation is simultaneously changed. A touch screen 1702 is an area in which an actual live video image captured by the image capturing apparatus 101 is displayed. In a case where the position of the image capturing apparatus 101 on the display portion 1701 is tapped, the live display of the designated image capturing apparatus 101 can be performed. The image capturing apparatus 101 of which image is currently displayed in the live display can be recognized on the display portion 1701 since the color, shape, size, or the like of the installation position of the image capturing apparatus 101 is changed as displayed in an area 1706. An image capturing button 1704 is used to issue an instruction to, for example, start motion image capturing, start still image capturing, or start automatic image capturing. An image capturing apparatus setting button 1705 is used to change settings for each of the image capturing apparatuses 101. In a case where the image capturing apparatus setting button 1705 is tapped, an image capturing apparatus setting menu is displayed, to enabling the user to manually operate settings for resolution, frame rate, white balance, and the like.

Figure 5A:
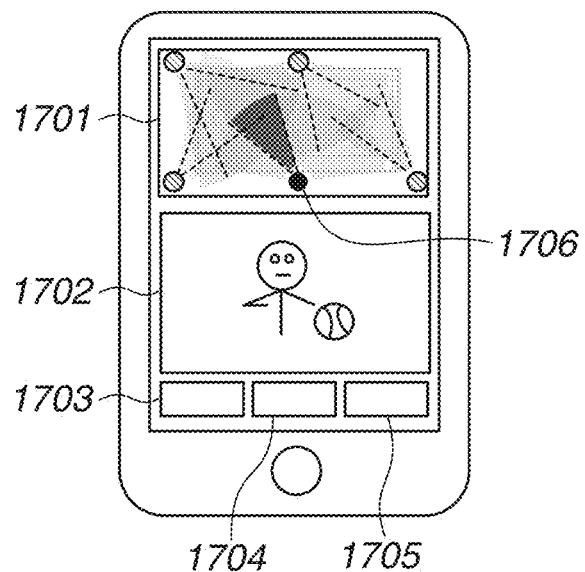
FIG. 5A is a diagram illustrating a remote control setting mode of an application according to the first exemplary embodiment.
Figure 5B:
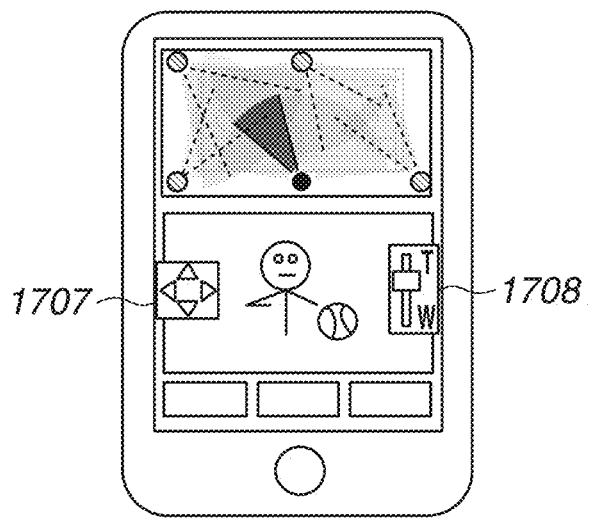
FIG. 5B is a diagram illustrating a remote control setting mode of an application according to the first exemplary embodiment.

A "remote control operation button" 1703 is tapped in a case where the user operates the image capturing apparatus 101 by a remote operation, and the screen is shifted to a remote operation screen. When the screen is shifted to the remote operation screen, the screen illustrated in FIG. 5B is displayed. On the remote operation screen, an operation portion 1707 that enables the user to perform a pan/tilt operation and an operation portion 1708 that enables the user to perform a zoom operation are displayed. When an up-down icon of the operation portion 1707 for pan/tilt driving is touched, tilt driving for the designated image capturing apparatus 101 is performed, and when a right-left icon of the operation portion 1707 for pan/tilt driving is touched, pan driving for the designated image capturing apparatus 101 is performed, to enable the user to change the optical axis of the image capturing apparatus 101. When a slide operation is performed on a switch icon upward by operating the icon corresponding to the operation portion 1708, zoom driving is performed in a direction (telephoto side) in which the angle of view is decreased, and when a slide operation is performed on the switch icon downward, zoom driving is performed in a direction (wide angle side) in which the angle of view is increased. By the above-described configuration, the angle of view can be changed.

The present exemplary embodiment illustrates examples of display of operation icons, such as the operation portions 1707 and 1708. However, instead of displaying such operation icons, zoom driving may be performed by a pinch-out or pinch-in operation within the touch screen 1702, or pan/tilt driving may be performed by a slide operation.

Figure 5C:
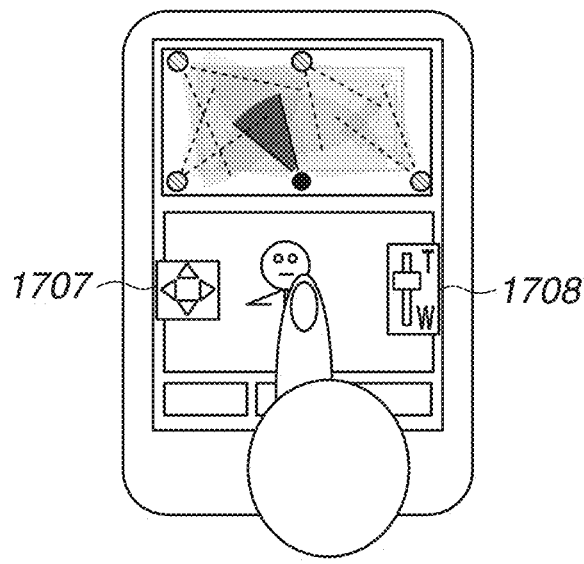
FIG. 5C is a diagram illustrating a remote control setting mode of an application according to the first exemplary embodiment.
Figure 5D:
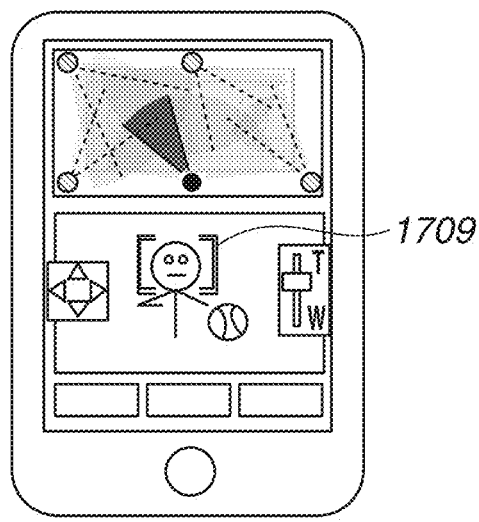
FIG. 5D is a diagram illustrating a remote control setting mode of an application according to the first exemplary embodiment.

In a case where pan, tilt, or zoom driving is automatically performed in such a manner that the designated subject is captured at a predetermined position on the screen (e.g., in the vicinity of the center of the screen), the subject may be designated by a touch operation as illustrated in FIG. 5C. In a case where the subject is designated by a touch operation, tracking of the subject is automatically controlled and a subject frame 1709 is displayed in such a manner that the subject that is currently tracked can be visually recognized as illustrated in FIG. 5D. Tracking of the subject is continued until tracking is cancelled, and tracking of the subject may be cancelled by, for example, touching a displayed cancel button, or tracking of the subject may be cancelled in a case where the optical axis or the angle of view of the image capturing apparatus 101 is manually changed on, for example, the operation portions 1707 and 1708.

A warning display in a case where image capturing cannot be performed on the designated image capturing area due to an obstacle causing a blind spot (e.g., when a person moves to the front of the image capturing apparatus 101 and stays on the spot) during the automatic framing and image capturing operation will be described.

As described above with reference to FIGS. 9 to 14F, the image capturing area is designated. Accordingly, in a case where a subject that is on the front side and at a position closer to the image capturing apparatus 101 than the range set as the image capturing area and in a case where the area in which the subject is captured in the image capturing range is greater than a predetermined value, it is determined that a dead spot occurs. Then, a warning display is performed in a smart device application. For example, information indicating the image capturing apparatus 101 in which a dead spot occurs is sent to the smart device 301, and a warning is issued to the user by, for example, blinking an icon, or performing an error display on the image capturing apparatus 101 in the display area of the display portion 1701 in the application. The distance measurement may be performed by any method, such as a method using focusing or a method using an external sensor. Alternatively, in a case where the same subject is tracked and captured simultaneously by the plurality of image capturing apparatuses 101 or in a case where the same image capturing area is captured by the plurality of image capturing apparatuses 101, a warning display may be performed when image information (subject detection information or character information, such as a hue or chroma in an image) about an image capturing apparatus 101 among the plurality of image capturing apparatuses 101 does not match image information about other image capturing apparatuses 101.

<Determination of Priority for Image Capturing Apparatus by Subject Designation>

(Determination of Priority for Image Capturing Apparatus by Touch Subject Designation)

By the above-described method, the image capturing subject can be designated by a touch operation. First, by a method as illustrated in FIGS. 5C and 5D, the distance from each of the image capturing apparatuses 101 to the subject, the azimuth angle of the optical axis of each of the image capturing apparatuses 101, and subject detection information (object determination information, face information, or character information about a hue, chroma, or the like in an image which have been preliminarily trained) about the image capturing apparatus 101 in which the subject is designated by a user operation is acquired. Based on the acquired distance to the subject and the azimuth angle of the optical axis of the image captured apparatus in which the subject is designated, the position coordinates of the subject on the layout coordinates of each of the image capturing apparatuses 101 area calculated. Further, the distance from the position coordinates of the subject to each of the image capturing apparatuses 101 is calculated, and a temporary priority is first set in such a manner that the image capturing apparatus 101 that is closer to the subject has a high priority. In this operation, in a case where the image capturing apparatus 101 that is determined to have a highest priority corresponds to the image capturing apparatus 101 in which the subject is designated, the temporary priority setting can be directly used as the priority setting. In this operation, in a case where the image capturing apparatus 101 that is determined to have a highest priority does not correspond to the image capturing apparatus 101 in which the subject is designated, pan/tilt driving is performed to change the azimuth angle of the optical axis of the image capturing apparatus 101 and zoom driving is performed to change the angle of view, to capture the subject by the image capturing apparatus 101 having the highest temporary priority. After the driving in the subject direction, the subject detection information received from the image capturing apparatus 101 in which the subject is designated is transmitted to the image capturing apparatus 101 set to the highest temporary priority. Then, in a case where the image capturing apparatus 101 set to the highest temporary priority detects the subject, the image capturing apparatus 101 set to the highest temporary priority is set to a high priority.

Alternatively, in a case where a person is set as the subject and a coincidence that is obtained using a predetermined condition based on detected face information is used, the image capturing apparatus 101 having a higher coincidence may be assigned a high priority (e.g., a priority is increased with orientation of a face toward the front side, or a priority is increased with increasing the size of a face). Also, in a case where an object other than a person is set as the subject, in a case where the subject is registered in advance, the image capturing apparatus 101 having a higher coincident may be set to a high priority based on the coincidence of the subject (a score obtained as a result of estimation and execution using a trained model based on a previous learning result) (coincidence indicates subject reliability).

High-priority and low-priority image capturing apparatuses are set based on the distance from each of the image capturing apparatus 101 to the designated subject or the reliability of the subject as described above. However, in a case where the image capturing apparatus 101 is extremely far from the designated subject and it is difficult to track the subject and capture an image of the subject, the image capturing apparatus 101 is set so as not to follow an instruction from the image capturing apparatus 101 set to a high priority. Specifically, in a case where the image capturing apparatus 101 is within the range in which the distance to the designated subject is less than or equal to a predetermined value is set to a low priority and is controlled to follow an instruction from the image capturing apparatus 101 set to a high priority by a method to be described below. Meanwhile, in a case where the distance to the designated subject is more than or equal to the predetermined value, the image capturing apparatus 101 is set not to follow an instruction from the image capturing apparatus 101 set to a high priority. The image capturing apparatus 101 that is not set to either a high priority or a low priority is operated by performing an automatic subject search operation in the image capturing apparatus 101.

In the designation of the subject by the above-described method, not only a single subject, but also a plurality of subjects may be designated. When a second subject is designated, the high-priority image capturing apparatus and the low-priority image capturing apparatus that follows an instruction from the high-priority image capturing apparatus are set by a method similar to that described above. All the image capturing apparatuses 101 calculate the distance to each of the two subjects, and set high-priority image capturing apparatuses and low-priority image capturing apparatuses that follow an instruction from any one of the image capturing apparatuses 101. At least one low-priority image capturing apparatus that follows an instruction from the high-priority image capturing apparatus is set for the high-priority image capturing apparatus.

(Determination of Priority for Image Capturing Apparatus by Automatic Subject Detection)

In the above-described method, the user manually designates a subject. Alternatively, a subject to be detected may be registered in advance and when the subject is automatically detected by each of the image capturing apparatuses 101, the subject may be automatically designated. In this case, in a case where the subject is detected, the priority for each of the image capturing apparatuses 101 is set by a method similar to that when the subject is manually designated.

Also, in a case where a plurality of subjects is detected, the priority for each of the image capturing apparatuses 101 is set by a method similar to that in a case where the subject is manually designated.

In a case where a plurality of subjects is automatically detected and tracked, the image capturing apparatus 101 that is determined to be tracking the subject with higher accuracy can be determined to be an image capturing apparatus 101 having a high priority. The image capturing apparatus 101 that is determined to be tracking the subject with lower accuracy can also be determined to be an image capturing apparatus 101 having a low priority.

(Determination of Priority for Image Capturing Apparatus by Manual Operation)

As described above with reference to FIG. 5B, during a manual operation for controlling each of the image capturing apparatuses 101 for which the user manually operates pan, tilt, and zoom functions, the image capturing apparatus 101 that is manually operated is set to a high priority. The distance to the image capturing subject is calculated based on zoom/focus information about the image capturing apparatus 101 that is manually operated, and the distance from each of the image capturing apparatuses 101 to the image capturing subject by a method similar to that described above. Further, the image capturing apparatus 101 within the range in which the distance to the image capturing subject is less than or equal to the predetermined value is set to a low priority and is controlled to follow an instruction from the image capturing apparatus 101 set to a high priority by a method to be described below. Meanwhile, in a case where the distance to the designated subject is more than or equal to the predetermined value, the image capturing apparatus 101 is set not to follow an instruction from the high-priority image capturing apparatus.

Figure 18:
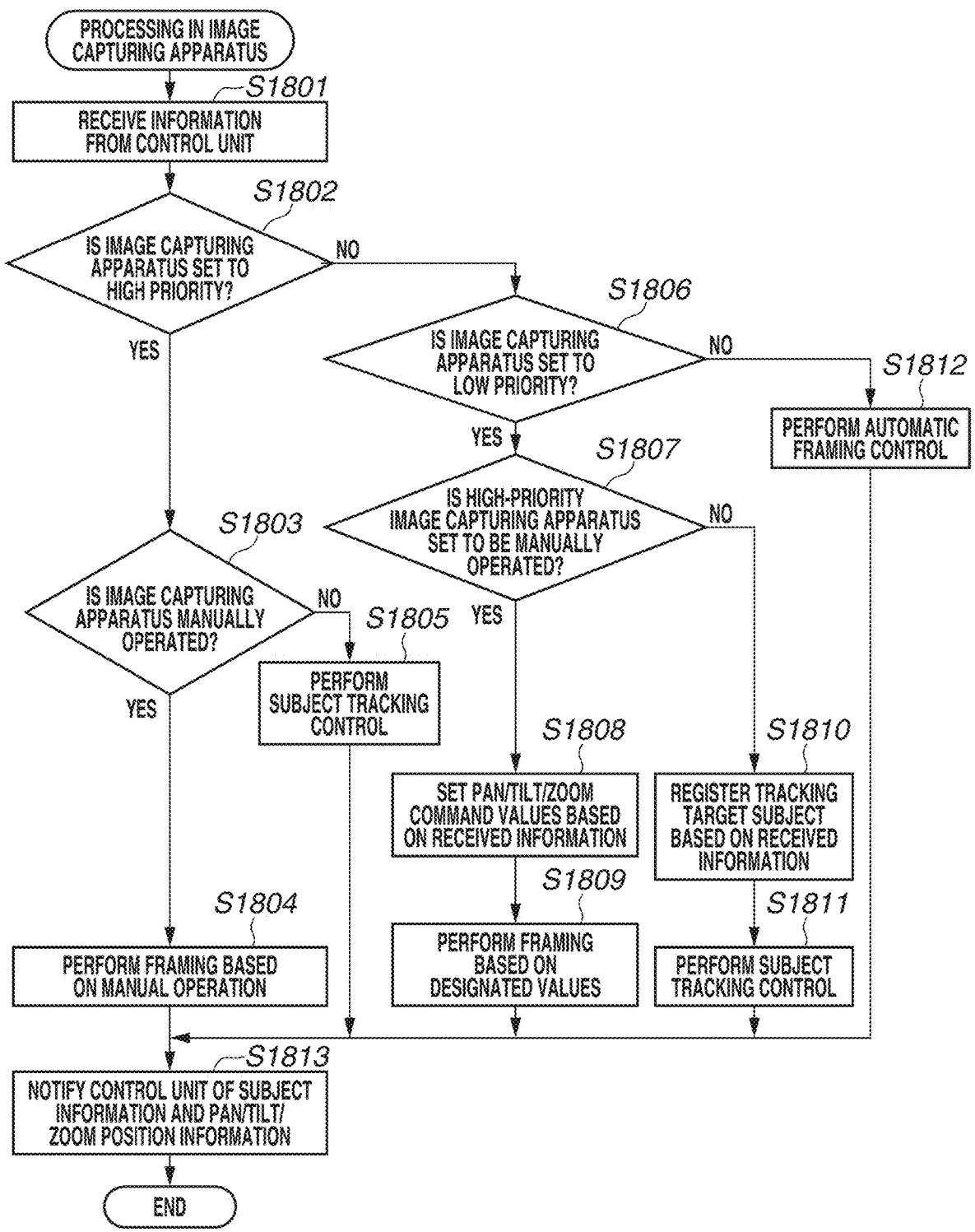
FIG. 18 is a flowchart illustrating a processing procedure for each image capturing apparatus based on a priority.

High-priority and low-priority image capturing apparatuses are set by the above-described method and automatic framing control is performed. A processing procedure will be described with reference to FIGS. 17 and 18.

FIG. 17 is a flowchart illustrating priority determination processing for each of the image capturing apparatuses 101 in the control unit (the smart device 301 or the server 602) to which information from each of the image capturing apparatuses 101 is sent.

In step S1701, whether a manual operation for pan/tilt/zoom driving as illustrated in FIG. 5B is performed is determined. In a case where the manual operation is performed (YES in step S1701), the processing proceeds to step S1702. In a case where the manual operation is not performed (NO in step S1701), the processing proceeds to step S1703.

In step S1702, temporal priority determination is performed by a manual operation. The image capturing apparatus 101 that is manually operated is set to a high temporary priority, and the distance to the image capturing subject is calculated based on the zoom/focus information or the like about the image capturing apparatus 101 that is manually operated. Then, the distance from each of the image capturing apparatuses 101 to the image capturing subject is calculated, and the temporary priority for each of the image capturing apparatuses 101 is set based on the magnitude of the distance.

The temporary priority set in this operation is defined as "temporary determination 1".

In step S1703, whether a subject is designated is determined. The subject designation may be manually set by the user, or the subject that is automatically registered in advance by the image capturing apparatus 101 may be detected and designated. A plurality of subjects may be designated. In a case where a subject is designated (YES in step S1703), the processing proceeds to step S1704. In a case where no subject is designated (NO in step S1703), the processing proceeds to step S1706.

In step S1704, after the subject is designated, subject distance information or the like is acquired from the image capturing apparatus 101 that is determined to have a high priority. While, immediately after the subject is designated, the designated image capturing apparatus 101 is the image capturing apparatus 101 having a high priority, the status of each of the image capturing apparatuses 101 is to be changed based on the priority for each of the image capturing apparatuses 101 as described above after the designation. In response to information being received from the image capturing apparatus 101 having a high priority, the processing proceeds to step S1705. In step S1705, the distance from each of the image capturing apparatuses 101 to the subject is calculated based on the subject distance information, and the temporary priority for each of the image capturing apparatuses 101 is set based on the magnitude of the distance and the reliability of the subject detected by each of the image capturing apparatuses 101. The temporary priority set in this operation is defined as "temporary determination 2". The processing of steps S1704 and S1705 is performed for each designated subject. Processing to be performed in a case where "temporary determinations 1 to 3" are detected will now be described by way of example. FIG. 19 is a table illustrating an example of priority calculation for each of the image capturing apparatuses 101 in a case where temporary determinations 1 to 3 are detected. Priorities for each of the image capturing apparatuses 101 are calculated as "temporary determination 1", "temporary determination 2", and "temporary determination 3", and the priorities are calculated based on distances (a11 to a16, a21 to a26, and a31 to a36) from each of the image capturing apparatuses 101 to the subject and subject reliabilities (b11 to b16, b21 to b26, and b31 to b36). A function by which a priority increases with decreasing the distance and increases with increasing the subject reliability is used.

In step S1706, the final priority for each of the image capturing apparatuses 101 is determined.

Among the image capturing apparatuses 101 set to a high priority, the image capturing apparatuses 101 to be preferentially operated are determined in the order of "manual operation>manual subject designation>automatic subject designation".

A state where a manual operation, manual subject designation, and automatic subject designation are executed will now be described by way of example. Since the temporary determination 1 corresponds to the determination of the manual operation, the image capturing apparatus 101 having a high priority is fixed as the image capturing apparatus 101 that is manually operated in the temporary priority 1. Assume herein that the temporary priority 1 is set to the image capturing apparatus 1 and the priority is set in the order of image capturing apparatus 2>image capturing apparatus 3>image capturing apparatus 4>image capturing apparatus 5>image capturing apparatus 6. Next, assume that the subject designation is manually performed and the temporary determination 2 is set. In this operation, since the image capturing apparatus 1 is determined to be manually operated and thus has a high priority, the image capturing apparatus is excluded from the target for the temporary determination 2 and the subsequent determination. Assume herein that the temporary priority 2 is set in the order of image capturing apparatus 2>image capturing apparatus 3>image capturing apparatus 4>image capturing apparatus 5>image capturing apparatus 6. The image capturing apparatus 2 set to the highest priority is set as the high-priority image capturing apparatus.

Automatic subject designation is executed in a case where the image capturing apparatus 101 that is not set by a manual operation or manual subject designation detects the registered subject. Accordingly, the low-priority image capturing apparatus that follows an instruction from the high-priority image capturing apparatus is first set from each of the temporary determination 1 by a manual operation and the temporary determination 2 by manual subject designation. In this case, since the image capturing apparatus 1 and the image capturing apparatus 2 are each set to a high priority, the low-priority image capturing apparatus that follows an instruction from each image capturing apparatus is set from among the image capturing apparatuses 3 to 6. In this operation, the priority in the temporary determination 1 and the priority in the temporary determination 2 are set in the order of image capturing apparatus 2>image capturing apparatus 3>image capturing apparatus 4>image capturing apparatus 5>image capturing apparatus 6. In each of the temporary determination 1 and the temporary determination 2, it may be desirable to set the image capturing apparatus 3 to a low priority. However, since the priority in the temporary determination 1 is higher than the priority in the temporary determination 2, the image capturing apparatus 3 is set as the low-priority image capturing apparatus that follows an instruction from the image capturing apparatus having a high priority in the temporary determination 1, and the image capturing apparatus 4 is set as the low-priority image capturing apparatus that follows an instruction from the image capturing apparatus having a high priority in the temporary determination 2. In this operation, in a case where the temporary priority 1 and the temporary priority 2 for the image capturing apparatus 5 and the image capturing apparatus 6 are smaller than a predetermined value and the high-priority image capturing apparatus that follows an instruction from each image capturing apparatus is not set, the image capturing apparatus 5 and the image capturing apparatus 6 are operated to automatically perform framing and image capturing.

In this operation, in a case where the registered subject is automatically detected in the image capturing apparatus 5, the image capturing apparatus 5 is set as the image capturing apparatus having a high priority in the temporary determination 3. In a case where the value of the temporary priority 3 for the image capturing apparatus 6 is more than or equal to the predetermined value, the image capturing apparatus 6 is set as the low-priority image capturing apparatus that follows an instruction from the image capturing apparatus having a high priority in the temporary determination 3.

As described above, in step S1706, in a case where the manual operation, manual subject designation, or automatic subject designation is performed, the high-priority image capturing apparatus and the low-priority image capturing apparatus that follows an instruction from the high-priority image capturing apparatus are set, and information is sent to each image capturing apparatus. Then, the processing is terminated. This processing is sequentially executed for each communication sampling.

Next, a processing procedure for the image capturing apparatus 101, based on the priority determined as described above, will be described with reference to FIG. 18.

In step S1801, information, such as the priority set by the method described above with reference to FIGS. 17 and 19, is received from the control unit (the smart device 301 or the server 602), and then the processing proceeds to step S1802. In step S1802, whether the image capturing apparatus 101 is set to a high priority based on the received information is determined. In a case where it is determined that the image capturing apparatus 101 is set to a high priority (YES in step S1802), the processing proceeds to step S1803. In a case where it is determined that the image capturing apparatus 101 is not set to a high priority (NO in step S1802), the processing proceeds to step S1806.

In step S1803, whether the image capturing apparatus 101 is manually operated is determined based on the received information. In a case where the image capturing apparatus 101 is manually operated (YES in step S1803), the processing proceeds to step S1804. In step S1804, the image capturing apparatus 101 is driven and controlled based on the received manual operation instruction (pan/tilt/zoom instruction). In a case where the image capturing apparatus 101 is not manually operated (NO in step S1803), the processing proceeds to step S1805. In this case, since the image capturing apparatus 101 is not manually operated and has a high priority, it is determined that the image capturing apparatus 101 corresponds to the image capturing apparatus in which the subject is designated. Accordingly, tracking of the subject is controlled in such a manner that the subject is captured in the vicinity of the center of the screen by performing an automatic pan/tilt/zoom control on the currently set subject. After the processing of steps S1804 and S1805 is performed, the processing proceeds to step S1813.

In step S1802, in a case where it is determined that the image capturing apparatus 101 is not set to a high priority based on the received information (NO in step S1802), the processing proceeds to step S1806. In step S1806, it is determined whether the image capturing apparatus 101 is set to a low priority (that is, whether the image capturing apparatus 101 is the low-priority image capturing apparatus that follows an instruction from another image capturing apparatus 101 having a high priority) based on the information received in step S1806. In a case where the image capturing apparatus 101 is set to a low priority (YES in step S1806), the processing proceeds to step S1807. In a case where the image capturing apparatus 101 is not set to a low priority (NO in step S1802), the processing proceeds to step S1812. In step S1812, the image capturing apparatus 101 is not set to either a high priority or a low priority. Accordingly, the image capturing apparatus 101 is set to perform automatic framing control (automatic framing control is performed by a method to be described below). In step S1807, based on the received information, whether the high-priority image capturing apparatus followed by the image capturing apparatus 101 is set as the image capturing apparatus 101 that is manually operated is determined. In a case where the image capturing apparatus 101 is manually operated (YES in step S1807), the processing proceeds to step S1808. In step S1808, pan/tilt/zoom command values for controlling the image capturing apparatus 101 are set based on the received information, and then the processing proceeds to step S1809. In step S1809, pan/tilt/zoom driving is performed based on the received pan/tilt/zoom command values, and then the processing proceeds to step S1813. In step S1807, in a case where it is determined that the high-priority image capturing apparatus followed by the image capturing apparatus 101 is not set as the image capturing apparatus 101 that is manually operated (in other words, the high-priority image capturing apparatus followed by the image capturing apparatus 101 corresponds to the image capturing apparatus 101 in which the subject is designated) (NO in step S1807), the processing proceeds to step S1810. In this case, subject information about the tracking target subject (preliminarily trained object detection information, face information, and character information, such as a hue or chroma in an image) or the like is acquired from the received information, and the subject is registered. Then, the processing proceeds to step S1811. In step S1811, tracking of the registered subject is controlled in such a manner that the subject can be captured in the vicinity of the center of the screen by automatic pan/tilt/zoom control, and then the processing proceeds to step S1813.

In step S1813, current information (subject information and pan/tilt/zoom position information) about the image capturing apparatus 101 is sent to the control unit (the smart device 301 or the server 602) for performing the processing illustrated in FIG. 17, and then the processing is terminated. This processing is sequentially executed for each communication sampling.

By the above-described method, in the automatic image capturing system including a plurality of image capturing apparatuses 101, the image capturing priority for each of the plurality of image capturing apparatuses 101 is determined. Further, the image capturing apparatus 101 that is determined to have a high priority determines the content of processing to be performed by the image capturing apparatus 101 that is determined to have a low priority. Thus, the plurality of image capturing apparatuses 101 performs automatic framing and image capturing.

<Automatic Framing/Image Capturing Processing>

Next, automatic image capturing processing will be described in detail. When the image capturing button 1704 is pressed to issue an instruction to start image capturing control, the image capturing operation is started. The image capturing mode processing will be described with reference to FIG. 15.

In step S1501, the image processing unit 207 generates an image by performing image processing for subject detection on a signal obtained by the image capturing unit 206. A subject, such as a human figure or an object, is detected from the generated image.

In the case of detecting a human figure, the face or human body of the subject is detected. In face detection processing, a pattern for determining the face of each human figure is preliminarily set and an area that matches the pattern included in a captured image can be detected as as a face image. At the same time, a reliability indicating a likelihood of a subject face is calculated. The reliability is calculated based on, for example, the size of the face area in an image, or the coincidence with a face pattern. Also, in object recognition, an object that matches a preliminarily registered pattern can be recognized. It is also possible to extract a characteristic subject by a method using a histogram for a hue, chroma, or the like in a captured image. On the image of each subject captured within the image capturing angle of view, a distribution derived from the histogram for the hue, chroma, or the like is divided into a plurality of sections and images captured in each section are classified.

For example, a histogram for a plurality of color components is created for each captured image, and the color components are classified using an inverted V-shaped distribution range and images captured in areas belonging to a combination of the same sections are classified, to recognize image areas of the subject. An evaluation value is calculated for each of the recognized image areas of the subject, and the image area of the subject with the highest evaluation value is determined to be a main subject area. A subject to be detected may be learned in advance using convolutional neural networks (hereinafter abbreviated as CNN) or the like, and the CNN may be applied to face recognition or object recognition. Each piece of subject information can be obtained from image capturing information by the above-described method.

In step S1502, subject search processing is performed. The subject search processing includes the following processes.

(1) Area division
(2) Calculation of an importance level for each area
(3) Determination of a search target area These processes will be sequentially described below.

(1) Area Division

Area division will be described with reference to FIGS. 16A to 16D.

Figure 16A:
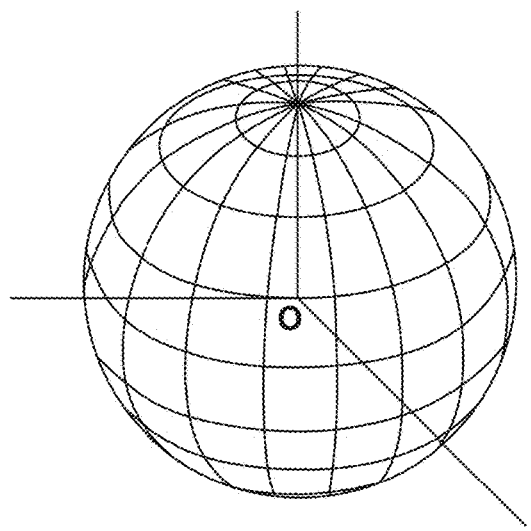
FIG. 16A is a diagram illustrating area division in a captured image according to the first exemplary embodiment.

As illustrated in FIG. 16A, area division is performed on an entire circumference about an image capturing apparatus position (an origin O is set as the image capturing apparatus position). In the example illustrated in FIG. 16A, the area is divided at every 22.5 degrees in each of a tilt direction and a pan direction. If the area is divided as illustrated in FIG. 16A, the circumference in the horizontal direction decreases and the area decreases as the angle of the image capturing apparatus 101 in the tilt direction is apart from 0 degrees.

Figure 16B:
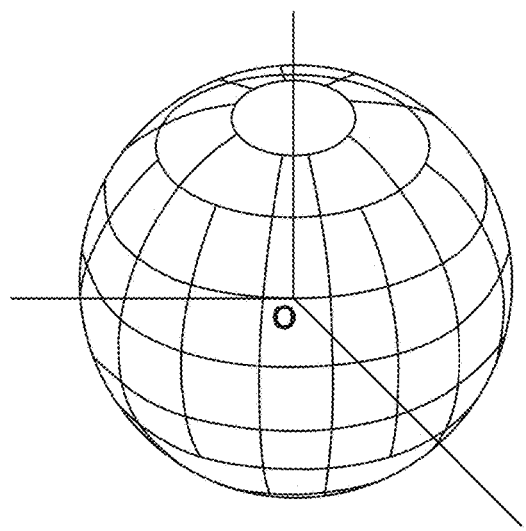
FIG. 16B is a diagram illustrating area division in a captured image according to the first exemplary embodiment.

Accordingly, as illustrated in FIG. 16B, when the tilt angle is 45 degrees or more, the area range in the horizontal direction is set to be greater than 22.5 degrees.

Figure 16C:
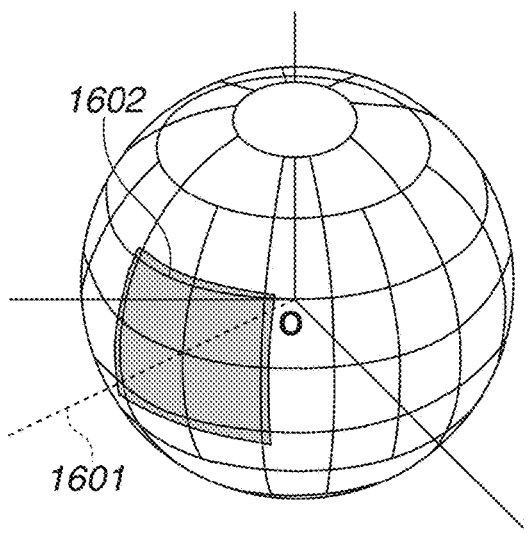
FIG. 16C is a diagram illustrating area division in a captured image according to the first exemplary embodiment.
Figure 16D:
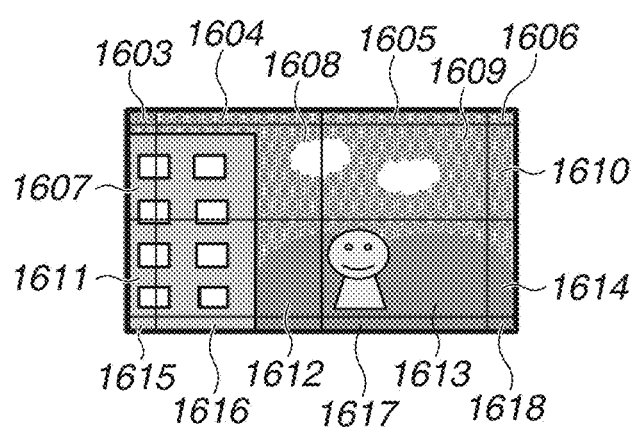
FIG. 16D is a diagram illustrating area division in a captured image according to the first exemplary embodiment.

FIGS. 16C and 16D each illustrate an example where area division is performed within the image capturing angle of view. An axis 1601 indicates the direction of the image capturing apparatus 101 in the initial state. Area division is performed based on the direction angle as a reference position. An area 1602 indicates an angle-of-view area of a captured image, and FIG. 16D illustrates an example of the image captured in this case. In the image captured within the angle of view, the image is divided into areas 1603 to 1618 as illustrated in FIG. 16D based on the area division.

(2) Calculation of an Importance Level for Each Area

For each area obtained by the area division as described above, the importance level indicating the priority order for search processing is calculated based on a subject in each area or an area scene status. The importance level based on the status of the subject is calculated based on, for example, the number of human figures in each area, the size of the face of each human figure, the orientation of the face, a face detection likelihood, the expression of each human figure, or the result of personal authentication of each human figure. The importance level based on the scene status is information about, for example, a general object recognition result, a scene determination result (blue sky, backlight, evening view, etc.), a level of sound in the direction of each area, an audio recognition result, or motion detection information within each area.

In a case where the user designates the image capturing area by the method described above with reference to FIGS. 12A to 14F, the importance level for an area in an area that is not designated as the image capturing area is fixed to a minimum value, to cause each of the image capturing apparatuses 101 to perform search and framing operation within the designated image capturing area. Thus, searching in the direction of the area that is not designated as the image capturing area is prevented from being executed.

If the processing is performed based only on the above-described conditions, the area with the highest importance level is not changed unless a change is detected in each area, which leads no change in an area to be searched. Accordingly, the importance level is changed depending on previous image capturing information. Specifically, importance level for an area that is continuously designated as the search area for a predetermined period of time may be decreased, or the importance level for an area on which image capturing is performed in step S1506 to be described below may be decreased for a predetermined period of time. In this case, however, an areas which is not designated as the image capturing area by the user is not changed and the importance level for the area is kept at the minimum value.

(3) Determination of a Search Target Area

After the importance level for each area is calculated as described above, an area with a high importance level is determined to be a search target area. Then, a pan/tilt search target angle for setting the search target area within the angle of view is calculated.

In step S1503, pan/tilt driving is performed. A driving angle for control sampling based on the pan/tilt search target angle is added to calculate the amount of pan/tilt driving, and the lens barrel rotation driving unit 205 drives and controls each of the tilt rotation unit 104 and the pan rotation unit 105.

In step S1504, the zoom unit 201 is controlled to perform zoom driving. Specifically, zoom driving is performed based on the state of the search target subject determined in step S1502. For example, in a case where a face of a human figure is set as the search target subject, and if the face on the image is extremely small and the size of the face is smaller than a detectable minimum size, it is difficult to detect the face and thus the subject may be lost from the sight. In such a case, control processing is performed to increase the size of the face on the image by zooming to the telephoto side. Meanwhile, in a case where the face on the image is extremely large, the subject is likely to fall outside of the angle of view due to the movement of the subject or the movement of the image capturing apparatus 101. In such a case, control processing is performed to decrease the size of the face on the screen by zooming to the wide angle side. By the above-described zoom control processing, the state suitable for tracking the subject can be maintained.

In steps S1502 to S1504, the method for performing subject search processing by pan/tilt/zoom driving is described. Alternatively, subject search processing may be performed using an image capturing system for capturing an image in all directions at once using a plurality of wide-angle lenses. In the case of using an omnidirectional image capturing apparatus, if image capturing, such as subject detection, is performed using all signals obtained by image capturing as input images, a vast amount of processing is required. For this reason, a part of the image is clipped and subject search processing is performed within the range of the clipped image. The importance level for each area is calculated by a method similar to that described above. The clipping position is changed based on the importance level, and automatic image capturing determination processing to be described below is performed. This enables a reduction in power consumption in image processing and enables high-speed subject search.

As described above with reference to FIG. 5A to 5D, in a case where a subject to be tracked is manually designated, or in a case where a specific subject is automatically detected and tracked, the above-described search operation is not performed. Pan/tilt driving is performed to keep the designated subject at a predetermined position on the screen (e.g., in the vicinity of the center of the screen), and zoom driving is performed to set the subject with a predetermined size.

In step S1505, whether an image capturing instruction is manually issued is determined. In a case where the image capturing instruction is manually issued (YES in step S1505), the processing proceeds to step S1506. Examples of the image capturing instruction to be manually issued include pressing a shutter button, tapping the casing of the image capturing apparatus 101 with a finger or the like, an audio command input, and an instruction from an external apparatus. An image capturing instruction to be issued by a tap operation is an image capturing instruction method in which when the user taps the casing of the image capturing apparatus 101, the apparatus shake detection unit 209 detects continuous high-frequency accelerations during a short period of time, and the detected accelerations are used as an image capturing trigger. An audio command input is an image capturing method in which when the user gives out a predetermined password (e.g., "take a picture") as an instruction to perform image capturing, the audio processing unit 214 recognizes the voice, and the recognized voice is used as an image capturing trigger. An instruction from an external apparatus is an image capturing instruction method in which a shutter instruction signal that is transmitted from, for example, a smartphone or the like that is connected to the image capturing apparatus 101 by wireless communication via a dedicated application is used as a trigger.

In step S1506, automatic image capturing determination processing is performed. In the automatic image capturing determination processing, whether image capturing is performed is determined.

<Determination of Whether to Perform Automatic Image Capturing>

Determination of whether to perform automatic image capturing is performed based on the following two determinations. In one of the determinations, based on the importance level for each area obtained in step S1502, in a case where the importance level exceeds a predetermined value, it is determined to execute automatic image capturing. The other of the determinations is performed based on a neural network. The neural network is used to predict an output value based on an input value, and is capable of estimating an output value in accordance with a trained model for a new input value by preliminarily learning an input value and an output value as a model for the input value. The learning method will be described below. In the determination based on the neural network, a feature amount based on each subject or scene captured within the current angle of view and the state of each of the image capturing apparatuses 101 is provided as an input to neurons of an input layer, and calculations based on forward propagation rules for a multi-layer perceptron are performed to obtain values output from an output layer. In a case where the output value is more than or equal to a threshold, it is determined to execute automatic image capturing. Examples of features of each subject to be used include a current zoom magnification, a general object recognition result at a current angle of view, a face detection result, the number of faces captured at the current angle of view, a degree of smile in each face, a degree of eye closing, a face angle, a face authentication identification (ID) number, and a visual-line angle of a subject human figure. In addition, a scene discrimination result, an elapsed time from the previous image capturing time, current time, a variation based on GPS position information and a previous image capturing position, a current audio level, a human figure who is letting out his/her voice, or information about applause or cheering may also be used. Vibration information (acceleration information or the state of each of the image capturing apparatuses 101), environmental information (temperature, air pressure, illuminance, humidity, or an amount of ultraviolet light), or the like may also be used. These features are converted into values within a predetermined range, and the values are provided to neurons of the input layer as feature amounts. Accordingly, it may be desirable to use a number of neurons of the input layer corresponding to the number of the above-described feature amounts to be used.

In the determination based on the neural network, a connection weight between neurons is changed by learning processing to be described below, and therefore the output value can be changed and the determined result can be adapted to the learning result.

<Determination of Image Capturing Method>

In the determination of the image capturing method, which one of still image capturing and motion image capturing is executed is determined based on the state of each subject in the peripheral area detected in step S1501. For example, in a case where the subject (human figure) remains still, still image capturing is executed, and in a case where the subject is moving, motion image capturing or continuous shooting is executed. Alternatively, the determination based on the neural network may be performed. Yet alternatively, settings for each of the image capturing apparatuses 101 can be changed by a manual operation using a dedicated application, still image capturing can be designated, motion image capturing can be designated, or both still image capturing and motion image capturing can be set.

In step S1507, in a case where it is determined to execute image capturing in the automatic image capturing determination processing in step S1506 (YES in step S1507), the processing proceeds to step S1508. In a case where it is not determined to execute image capturing (NO in step S1507), the image capturing mode processing is terminated.

In step S1508, image capturing is started. In this operation, image capturing by the image capturing method determined in step S1506 is started. In the image capturing, the focus drive control unit 204 performs auto focus control. An aperture control unit, a sensor gain control unit, and a shutter control unit, which are not illustrated, are used to perform exposure control to set an appropriate brightness for the subject. After image capturing, the image processing unit 207 performs various known image processing, such as auto white balance processing, noise reduction processing, and gamma correction processing, to generate an image.

In the case of motion image capturing, the image capturing processing is performed while performing the framing operation by pan/tilt/zoom driving based on the subject detection as described above in steps S1501 to S1504 even during image capturing and recording. The search operation may be performed based on the importance level for each of the divided areas as described above, or a large volume of search operation may be prohibited during motion image capturing. A specific subject may be registered, and motion image capturing may be performed while the subject is tracked by pan/tilt/zoom driving within the designated image capturing area, to keep the registered subject in the vicinity of the center of the screen.

In step S1509, editing processing, such as processing of the image generated in step S1508, or adding of the image to a motion image, is performed. Specific examples of the processing of the image include trimming processing based on the face or focused position of a human figure, image rotation processing, a high dynamic range (HDR) effect, a defocusing effect, and a color conversion filter effect. In the processing of the image, based on the image generated in step S1508, a plurality of images may be generated by performing the above-described processes in combination, and the generated images may be stored separately from the image generated in step S1508. The motion image processing may be performed by, for example, adding a captured motion image or still image to a generated motion image to be edited while performing special effect processing, such as slide, zoom, or fade processing on the motion image.

In step S1510, the previous image capturing information is updated. Specifically, the count of the number of images captured in the current operation is incremented by "1" for each of the number of captured images for each area described above in step S1506, the number of captured images for each human figure registered in personal authentication, the number of captured images for each subject recognized in the general object recognition, and the number of captured images for each scene discriminated in the scene discrimination.

By the above-described method, designation of the image capturing area using the plurality of image capturing apparatuses 101 can be easily performed, and assistance can be provided for framing adjustment which is performed by the plurality of image capturing apparatuses 101 working in conjunction with each other in the designated image capturing area and for automatic image capturing processing which is performed by the plurality of image capturing apparatuses 101 focusing the designated image capturing area.

By the above-described method, designation of the image capturing area can be performed with a simple operation. Further, in the designated image capturing area, assistance can be provided for framing adjustment which is performed by the plurality of image capturing apparatuses 101 working in conjunction with each other and for automatic image capturing processing which is performed by the image capturing apparatuses 101 focusing the designated image capturing area. Accordingly, automatic image capturing that enables the user to easily capture a desired video image can be performed.

The present exemplary embodiment illustrates an example where a plurality of image capturing apparatuses having a configuration including pan/tilt/zoom functions illustrated in FIGS. 1A and 1B is used. Alternatively, among a plurality of image capturing apparatuses, one or more of image capturing apparatuses may have pan/tilt/zoom functions as illustrated in FIGS. 1A and 1B may be used. An image capturing apparatus including no pan/tilt functions and including only a zoom function may also be used. An image capturing apparatus including no zoom function and including only pan/tilt functions may also be used. Among image capturing apparatuses, image capturing apparatuses including no pan/tilt/zoom functions and having a fixed focal length may also be used. An omnidirectional image capturing apparatus which includes a plurality of image sensors and wide-angle optical systems and is configured to capture an image in all directions at once may also be used.

Second Exemplary Embodiment

A plurality of installed image capturing apparatuses 101 performs automatic framing adjustment using pan, tilt, and zoom functions. Each of the image capturing apparatuses 101 performs the automatic image capturing determination processing described above in step S1506, and in a case where it is determined that automatic image capturing is ON, automatic image capturing processing is started.

A second exemplary embodiment illustrates a method for performing automatic image capturing by a plurality of image capturing apparatuses working in conjunction with each other.

As described above in the first exemplary embodiment, each of the image capturing apparatuses 101 performs framing by automatically driving the pan, tilt, and zoom functions within the range designated by the user. In response to an automatic image capturing start instruction issued to a certain image capturing apparatus 101, the control unit acquires the distance from the image capturing apparatus 101 that is determined to perform automatic image capturing processing to a subject, the azimuth angle of the optical axis of the image capturing apparatus 101, and subject detection information (preliminarily trained object detection information, face information, and character information about a hue, chrome, or the like in an image) by a method similar to that described above in the <Determination of Priority for Image Capturing Apparatus by Automatic Subject Detection>section. Based on the acquired distance to the subject and the azimuth angle of the optical axis of the image capturing apparatus 101 in which the subject is designated, the control unit calculates the position coordinates of the subject on the layout coordinates of each of the image capturing apparatuses 101. Further, the control unit calculates the distance from the position coordinates of the subject to each of the image capturing apparatuses 101. The control unit sets the image capturing apparatus 101 that is closest to the subject as a main image capturing apparatus (image capturing apparatus having a high priority), and sets each of the other image capturing apparatuses as a sub image capturing apparatus (image capturing apparatus 101 having a low priority) that supports image capturing processing for the image capturing apparatus 101 that is closest to the subject.

A processing procedure for each of the image capturing apparatuses 101 and the control unit (the smart device 301 or the server 602) will be described with reference to FIGS. 21 and 22.

Figure 21:
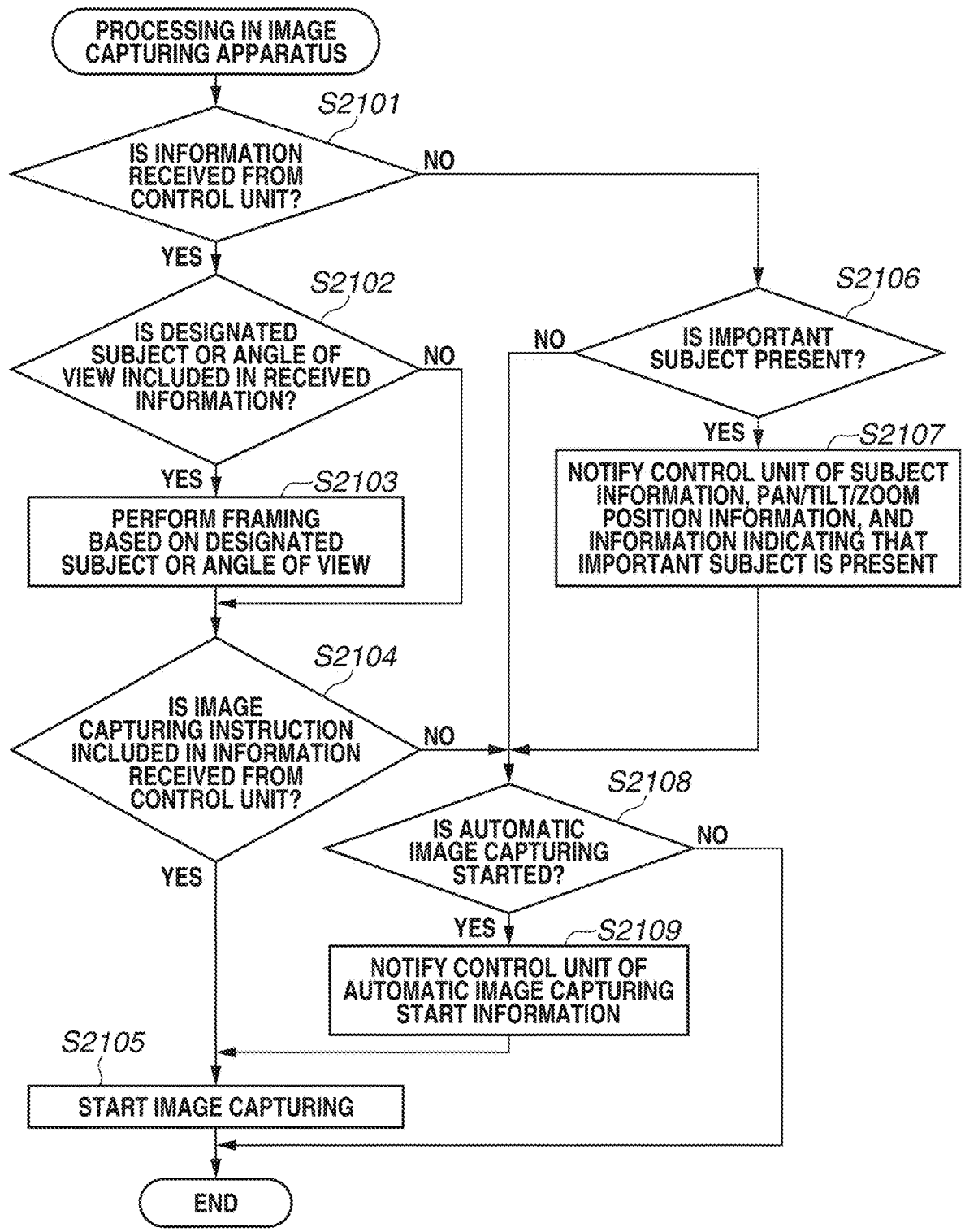
FIG. 21 is a flowchart illustrating a processing procedure in each image capturing apparatus.

FIG. 21 is a flowchart illustrating a processing procedure in each of the image capturing apparatuses 101.

In step S2101, whether information is received from the control unit is determined. In a case where it is determined that information is received from the control unit (YES in step S2101), the processing proceeds to step S2102. In step S2102, whether information about a designated subject or information about a designated angle of view is included in the information received from the control unit. In a case where it is determined that the information is included (YES in step S2102), the processing proceeds to step S2103. In a case where it is determined that the information is not included (NO in step S2102), the processing proceeds to step S2104. In step S2103, framing is performed by driving the pan, tilt, and zoom functions based on the designated subject or angle of view in accordance with the received information. In this case, the control unit calculates the position coordinates of the subject on the layout coordinates of each of the image capturing apparatuses 101. Further, the control unit transmits information for adjusting the pan, tilt, and zoom functions to perform image capturing in which the position coordinates of the subject is set within the angle of view of each of the image capturing apparatuses 101, and therefore each of the image capturing apparatuses 101 received the information can perform framing based on the information. The angle-of-view adjustment is performed by driving the pan, tilt, and zoom functions for the subject designated in step S2103, and then the processing proceeds to step S2104.

In a case where no information is received from the control unit in step S2101 (NO in step S2101), the processing proceeds to step S2106. In step S2106, whether an important subject (e.g., a specific human figure or a specific object which is preliminarily registered as the important subject) determined in the image capturing apparatus 101 is within the angle of view is determined. In a case where the important subject is present (YES in step S2106), the processing proceeds to step S2107. In step S2107, the pieces of information about the detected important subject (subject information and pan/tilt/zoom position information) are transmitted to the control unit, and then the processing proceeds to step S2108. In a case where it is determined that the important subject is not present (NO in step S2106), the processing proceeds to step S2108 without transmission of any information to the control unit.

In step S2104, whether information about an image capturing instruction is included in the information received from the control unit is determined. In a case where the information about the image capturing instruction information is included in the received information (YES in step S2104), the processing proceeds to step S2105. In step S2105, image capturing is started, and then the processing is terminated. This processing is sequentially executed in a predetermined cycle. In a case where the image capturing instruction information is not included in the information received from the control unit (NO in step S2104), the processing proceeds to step S2108.

In step S2108, the automatic image capturing determination processing is performed in the image capturing apparatus 101s by a method similar to the method described above in step S1506 illustrated in FIG. 15. In a case where it is determined that the automatic image capturing processing is started (YES in step S2108), the processing proceeds to step S2109. Simultaneously with the start of the automatic image capturing processing in the image capturing apparatus 101, automatic image capturing start information is sent to the control unit to issue the image capturing instruction to other image capturing apparatuses 101. Then, the processing proceeds to step S2105 to start image capturing. In a case where it is not determined that the automatic image capturing is started (NO in step S2108), the processing is terminated and the image capturing apparatus 101 waits for execution of processing in the next cycle.

Next, processing in the control unit (the smart device 301 or the server 602) will be described with reference to FIG. 22.

In a case where it is determined that information is received from any one of the image capturing apparatuses 101 (YES in step S2201), the processing proceeds to step S2202. In a case where no information is received (NO in step S2201), the processing is terminated without performing any other process. In a case where important subject determination information is included in the information received from each of the image capturing apparatuses 101 (YES in step S2202), the processing proceeds to step S2203. In a case where important subject determination information is not included in the received information (NO in step S2202), the processing proceeds to step S2206.

In step S2203, the image capturing apparatus 101 (sub image capturing apparatus) to simultaneously perform framing on the same subject is determined based on the information (subject information and pan/tilt/zoom position information) about the image capturing apparatus 101 that is determined to include the important subject determination information. Examples of the determination method include a method of determining a sub image capturing apparatus based on, for example, the distance from each of the image capturing apparatuses 101 to the subject, which is calculated based on the information from the image capturing apparatus 101 in which the subject is designated as described above with reference to FIG. 17. After the sub image capturing apparatus is selected, the processing proceeds to step S2204. In step S2204, the angle of view of the sub image capturing apparatus determined in S2203 is determined. Specifically, the position coordinates of the subject on the layout coordinates of the image capturing apparatus 101 set as the sub image capturing apparatus are calculated, and pan, tilt, and zoom information for setting the values of the coordinates of the subject which is within the angle of view of the image capturing apparatus 101 is calculated. In step S2205, information about the angle of view calculated in step S2204, subject information about the image capturing apparatus 101 determined to include the important subject determination information, and the like are sent to the image capturing apparatus 101 that is determined to be the sub image capturing apparatus. Then, the processing proceeds to step S2206.

In step S2206, whether automatic image capturing determination information is included in the information received from each of the image capturing apparatuses 101 is determined. In a case where the automatic image capturing determination information is included in the received information (YES in step S2206), the processing proceeds to step S2207. In a case where the automatic image capturing determination information is not included in the received information (NO in step S2206), the processing is terminated. In step S2207, the image capturing apparatus 101 to simultaneously perform image capturing is selected. In this operation, the sub image capturing apparatus selected in step S2203 may be selected as the image capturing apparatus 101 to simultaneously perform image capturing, or all image capturing apparatuses 101 having distance to the subject is less than or equal to a predetermined value may be selected as the image capturing apparatus 101 to simultaneously perform image capturing. Yet alternatively, all the installed image capturing apparatuses 101 may be selected as the image capturing apparatus to simultaneously perform image capturing. For example, in consideration of the number of images previously captured by each of the image capturing apparatuses 101, the image capturing apparatus 101 that has not been often used for image capturing may be preferentially selected as the image capturing apparatuses 101 to simultaneously perform image capturing. In step S2208, information about an image capturing start instruction is sent to the image capturing apparatuses 101 selected in step S2207. Then, the processing is terminated.

Figure 23:
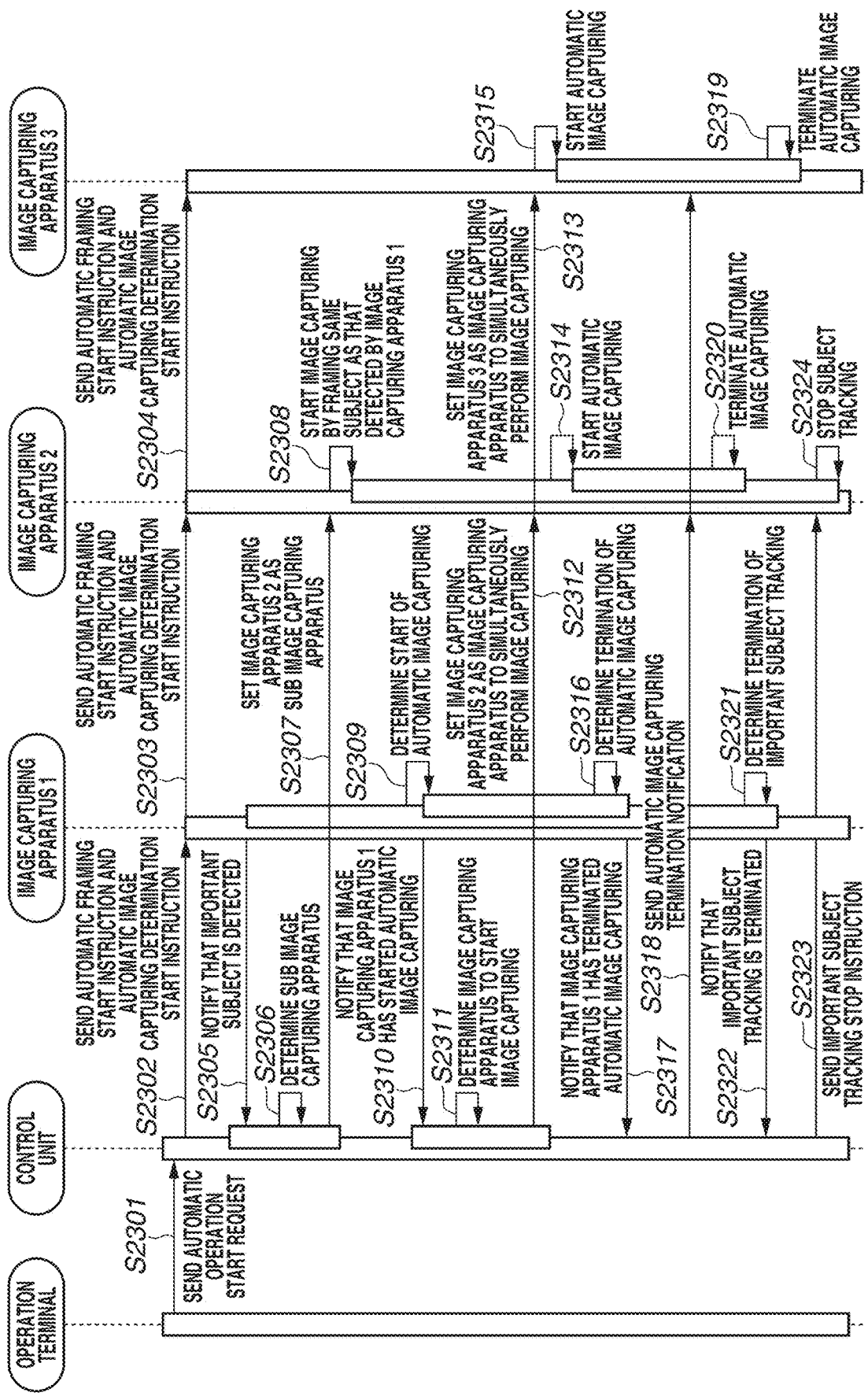
FIG. 23 is a diagram illustrating an automatic image capturing sequence for a plurality of image capturing apparatuses according to a second exemplary embodiment.

Next, an automatic image capturing sequence for a plurality of image capturing apparatuses 101 working in conjunction with each other according to the second exemplary embodiment will be described with reference to FIG. 23.

First, in step S2301, an automatic operation start request is sent from an operation terminal (the smart device 301 or the PC 603) to the control unit (the smart device 301 or the server 602). The operation terminal and the control unit may be the same device (smart device 301). In response to the automatic operation start request in step S2301, the control unit sends an automatic framing start instruction and an automatic image capturing determination start instruction to each of the image capturing apparatuses 101 (the image capturing apparatus 1, the image capturing apparatus 2, the image capturing apparatus 3, and . . . ) in steps S2302, S2303, and S2304.

Figure 15:
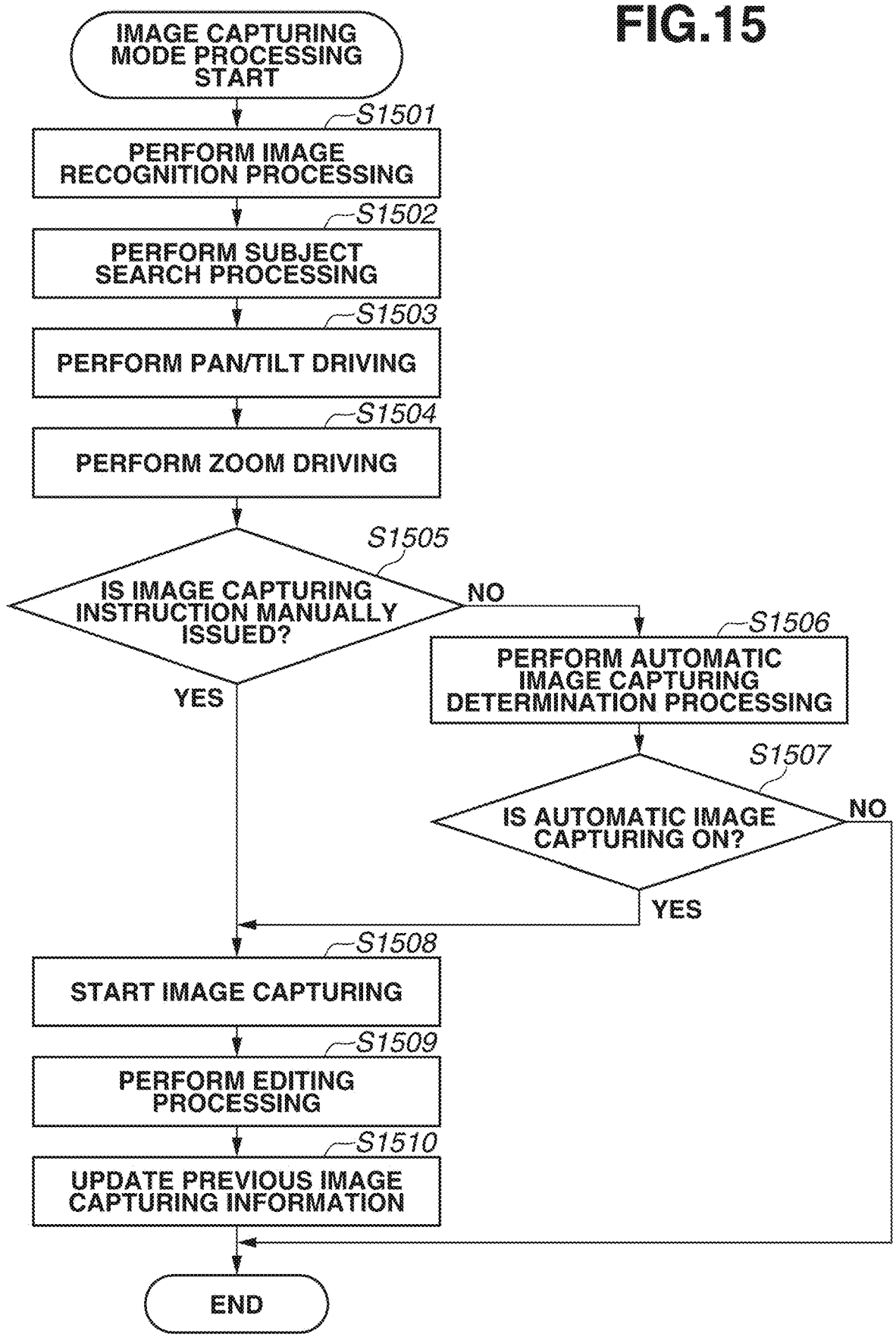
FIG. 15 is a flowchart illustrating image capturing processing according to the first exemplary embodiment.

Each image capturing apparatus performs processing illustrated in FIGS. 15 and 21. Upon detecting an important subject, in step S2305, the image capturing apparatus 1 sends an important subject detection notification to the control unit. In response to the important subject detection notification sent in step S2305, the control unit calculates the position coordinates of the subject on the layout coordinates of the image capturing apparatuses other than the image capturing apparatus 1, based on the distance from the image capturing apparatus 1 to the designated subject, the azimuth angle of the optical axis of the image capturing apparatus, and subject detection information (preliminarily trained object detection information, face information, and character information, such as a hue or chrome, in an image), to capture an image of the subject detected by the image capturing apparatus 1. Further, the distance from the position coordinates of the subject to each image capturing apparatus are calculated. Then, the image capturing apparatus that is closest to the subject is set as the main image capturing apparatus, and the image capturing apparatus that is the next closest to the subject is set as the sub image capturing apparatus that supports image capturing processing of the image capturing apparatus 1 in step S2306.

Assume herein that the image capturing apparatus 2 is determined to be the sub image capturing apparatus. To set the image capturing apparatus 2 as the sub image capturing apparatus in step S2307, a setting is performed in step S2308 to perform framing in such a manner that the same subject as that detected by the image capturing apparatus 1 is framed as described above in steps S2102 and S2103 illustrated in FIG. 21. After that, the image capturing apparatus 1 and the image capturing apparatus 2 each perform framing in such a manner that the same subject is captured within the image.

In step S2309, In response to determination that the image capturing apparatus 1 starts automatic image capturing, the image capturing apparatus 1 starts automatic image capturing processing. The automatic image capturing processing will be described in detail below with reference to FIGS. 20A, 20B, and 20C. Next, in step S2310, the image capturing apparatus 1 notifies the control unit that the image capturing apparatus 1 has started automatic image capturing processing. In step S2311, the control unit determines an image capturing apparatuses which starts image capturing, from among the image capturing apparatuses other than the image capturing apparatus 1. The present exemplary embodiment illustrates an example where the image capturing apparatus 2 and the image capturing apparatus 3 are selected as image capturing apparatuses to perform image capturing. In step S2312, the image capturing apparatus 2 is set as the image capturing apparatus which performs image capturing in conjunction with the image capturing apparatus 1. In step S2313, the image capturing apparatus 3 is set as the image capturing apparatus which performs image capturing in conjunction with the image capturing apparatus 1. In step S2314, the image capturing apparatus 2 starts automatic image capturing processing. In step S2315, the image capturing apparatus 3 starts automatic image capturing processing.

In this operation, the image capturing apparatus 2 adjusts the angle of view by driving the pan, tilt, and zoom functions for the same subject as that detected by the image capturing apparatus 1. Information about the size of the subject captured by the image capturing apparatus 1, information about the layout of the subject within the angle of view, subject information around a subject other than a main subject, and the like are sequentially sent to the image capturing apparatus 2 via the control unit. Framing adjustment may be performed in such a manner that the same subject is framed differently from that in the image capturing apparatus 1 by, for example, performing framing adjusting by varying the size of the main subject, performing framing adjustment by varying the layout of the main subject on the screen, or performing framing adjustment by determining whether to include subjects around the main subject, and therefore image capturing angle-of-view adjustment is performed to obtain various image capturing patterns.

In step S2316, in a case where it is determined that automatic image capturing processing is terminated in the image capturing apparatus 1, the processing proceeds to step S2317. In step S1317, the image capturing apparatus 1 sends a notification indicating that the automatic image capturing processing is terminated to the control unit. The control unit sends an automatic image capturing termination notification about the image capturing apparatus 1 to each of the image capturing apparatus 2 and the image capturing apparatus 3 in step S2318. In a case where the automatic image capturing determination processing is not performed in each image capturing apparatus, in step S2320, the automatic image capturing processing is terminated immediately. Even when the automatic image capturing termination notification is sent in step S2318, in a case where the automatic image capturing determination processing is continued in the image capturing apparatus (e.g., when the important subject is continuously selected, or when the number of captured images is small), the automatic image capturing processing is continued. Then, in a case where it is impossible to detect an important subject or in a case where the number of captured images has reached a predetermined number or more, for example, the automatic image capturing processing is terminated in step S2319.

Even when the image capturing apparatus 1 has sent an automatic image capturing processing termination notification in step S2317, in a case where the important subject determination set in step S2305 is maintained, the sub image capturing apparatus set in step S2307 is continuously set. Accordingly, for example, in a case where it is determined that the image capturing apparatus 1 has difficulty in detecting an important subject, or in a case where it is determined that image capturing processing is performed to a full extent and thus further image capturing processing is not performed, the termination of the important subject tracking is determined in step S2321. In step S2322, an important subject tracking termination notification for the image capturing apparatus 1 is sent to the control unit. In response to the notification in step S2322, the control unit sends a notification for cancelling subject tracking to the image capturing apparatus 2. In step S2324, the image capturing apparatus 2 stops subject tracking and performs subject searching and framing processing based on the determination in the image capturing apparatus 2.

Figure 22:
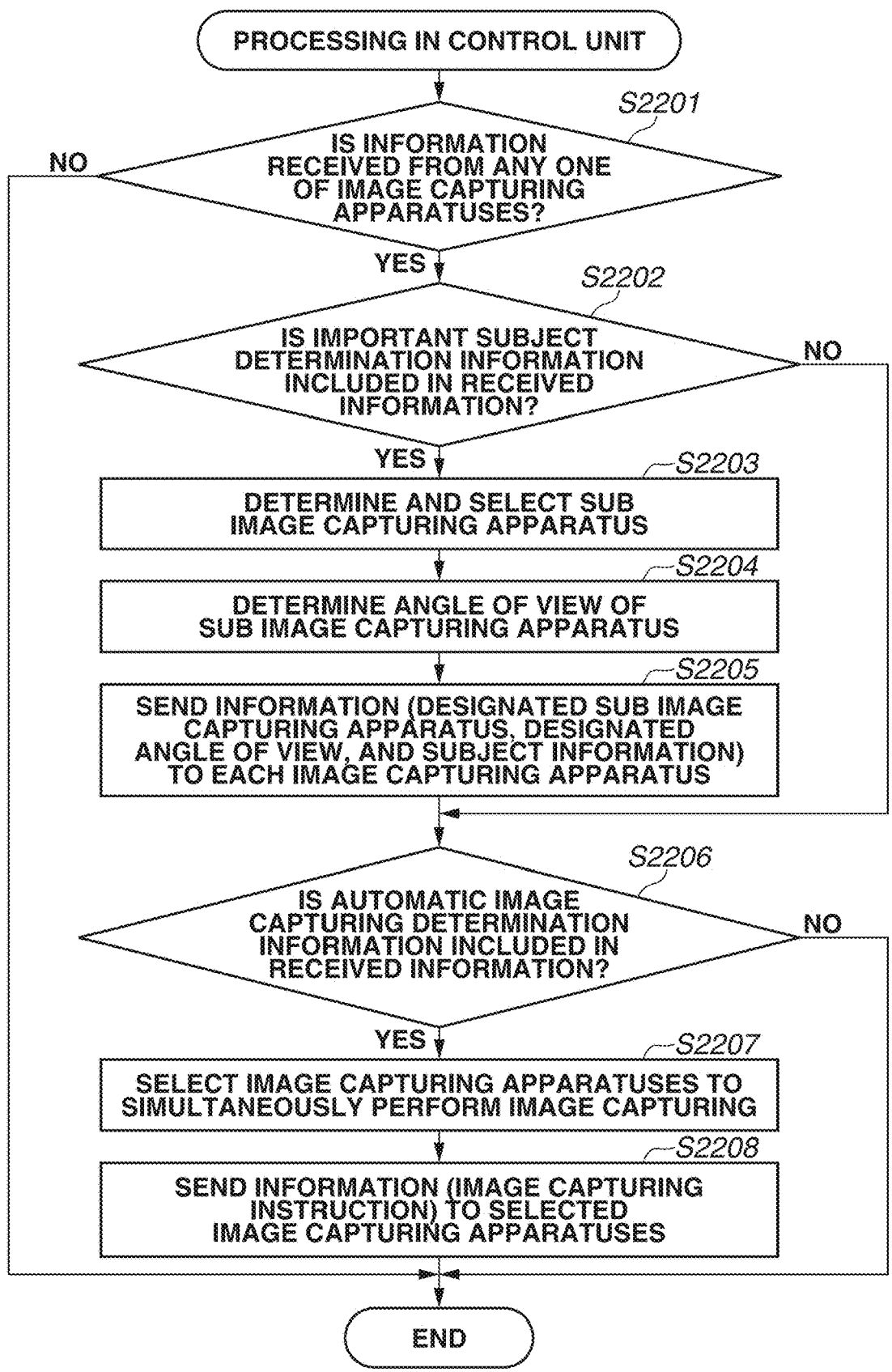
FIG. 22 is a flowchart illustrating a processing procedure in the control unit.

Next, automatic image capturing processing which is performed by each image capturing apparatus as illustrated in FIGS. 21 and 22 will be described with reference to timing diagrams of FIGS. 20A, 20B, and 20C.

A case where the image capturing apparatus 1 performs automatic image capturing determination processing and the image capturing apparatus 2 is selected as the image capturing apparatus to start image capturing substantially simultaneously via the control unit will now be described by way of example. In the automatic image capturing determination processing in step S2108, it is determined that the image capturing apparatus 1 is in an automatic image capturing determination period, and an automatic image capturing ON period is continued until no important subject is detected in the image capturing apparatus 1. In the automatic image capturing ON period, a timing for starting still image capturing processing is determined based on the subject information, and the still image capturing processing is performed. The image capturing start determination in the ON period may be performed by, for example, determination using the neural network as described above in step S1506, or determination based on rules that a fixed gain is multiplied by each character information based on information about a general object recognition result, a face detection result, the number of faces captured in the current angle of view, a degree of smile in each face, a degree of eye closing, a face angle, a face authentication ID number, a visual-line angle of a subject human figure, and the like, and then a total sum is calculated as a score. A score for an image capturing timing may be calculated by determination using the neural network or determination based on rules, and image capturing may be started in a case where the score is more than or equal to a score for previous image capturing, or image capturing may be performed at predetermined time intervals in a case where the score that is more than or equal to a certain value is continuously obtained. Alternatively, image capturing may be performed when the character information (e.g., a degree of smile in each face, or the number of faces) is changed.

When it is determined that the image capturing apparatus 1 is in the automatic image capturing ON period, a notification that the image capturing apparatus 2 is in the automatic image capturing ON period is sent to the image capturing apparatus 2 via the control unit, and the automatic image capturing determination processing for the image capturing apparatus 2 is set to ON.

Figure 20A:
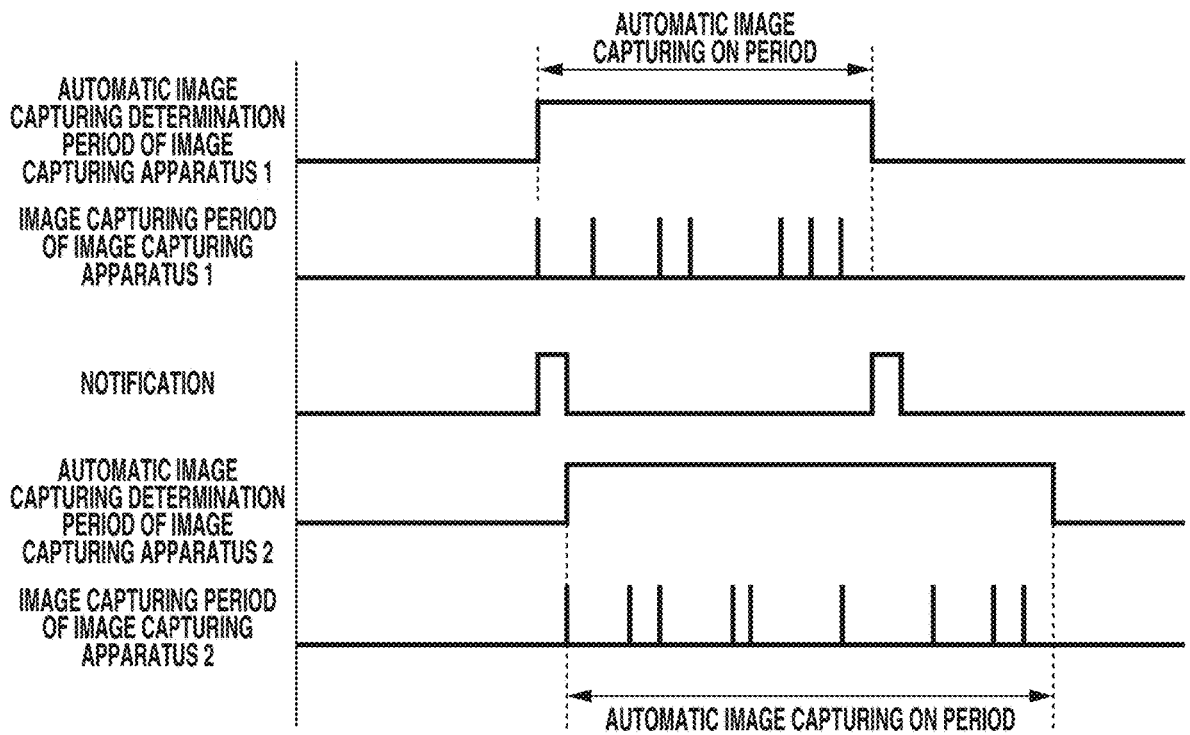
FIG. 20A is a timing diagram illustrating automatic image capturing processing in each image capturing apparatus in a case where an image capturing apparatus 1 and an image capturing apparatus 2 are not synchronized.

Referring to FIG. 20A, image capturing start determination processing is performed based on information about, for example, the image detected in the processing performed by the image capturing apparatus 2, and image capturing determination processing is individually performed without synchronizing the image capturing timing of capturing images one by one with the image capturing apparatus 1. Referring to FIG. 20A, it is determined that the automatic image capturing determination period for the image capturing apparatus 1 ends, and even after the notification indicating that the automatic image capturing determination period ends is sent to the image capturing apparatus 2 via the control unit, the automatic image capturing ON period is continued until the image capturing determination period in the processing performed by the image capturing apparatus 2 is set to OFF. In other words, the plurality of image capturing apparatuses each includes an automatic image capturing determination unit that sets a main subject and determines automatic image capturing. For example, information about the main subject or angle-of-view adjustment information is sent to the image capturing apparatus 2 via the control unit, to capture the same subject as that set by a main subject setting unit in the image capturing apparatus 1 within the angle of view, and accordingly the plurality of image capturing apparatuses can simultaneously perform automatic image capturing processing on the subject. At the same time when the image capturing apparatus 1 is determined to perform automatic image capturing processing, it is determined that the automatic image capturing period of at least one of image capturing apparatus other than the image capturing apparatus 1 is started. Then, in the automatic image capturing period of each image capturing apparatus, each image capturing apparatus further performs image capturing trigger determination processing and each image capturing apparatus performs automatic image capturing processing. Determination of whether the automatic image capturing period of each image capturing apparatus ends is performed in each image capturing apparatus.

Figure 20B:
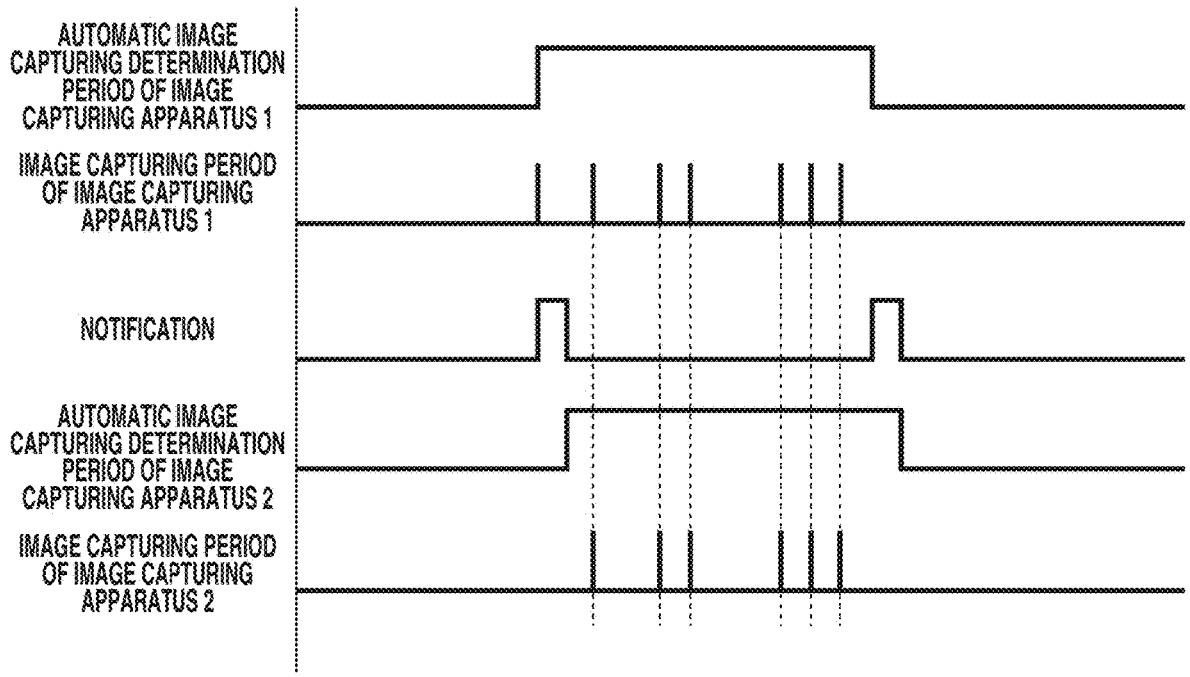
FIG. 20B is a timing diagram illustrating automatic image capturing processing in each image capturing apparatus.
Figure 20C:
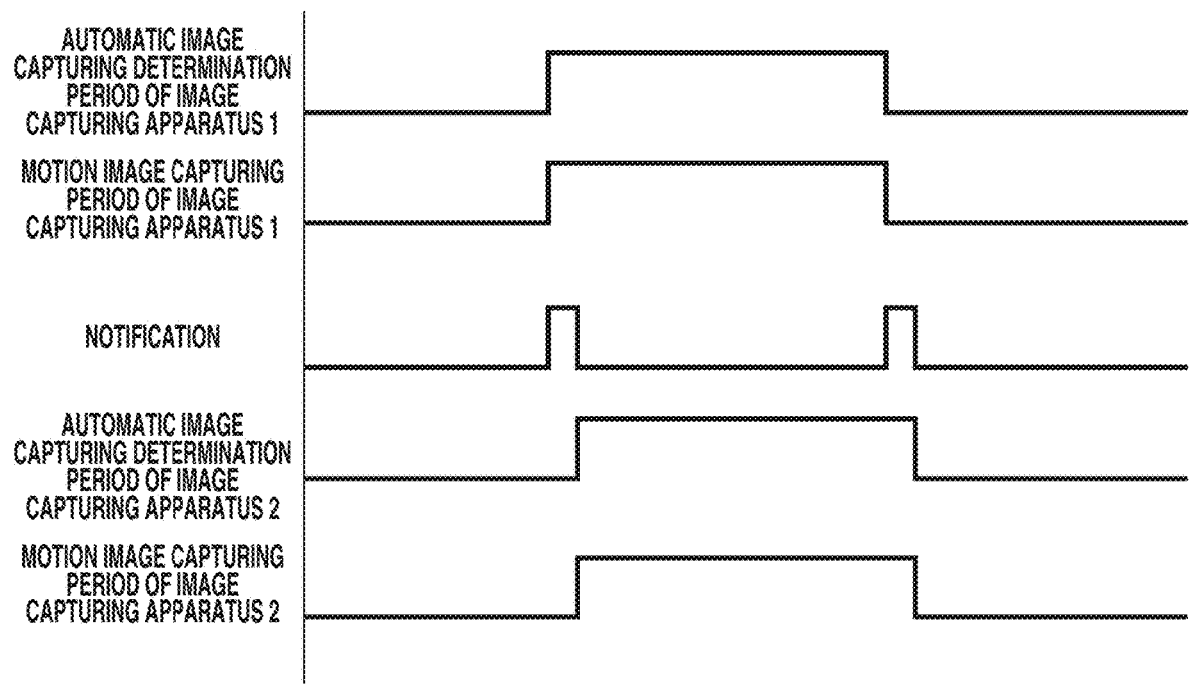
FIG. 20C is a diagram illustrating an example where automatic motion image capturing is determined in the image capturing apparatus 1.

Referring to FIG. 20B, image capturing start determination processing is performed based on information about, for example, the image detected in the processing performed by the image capturing apparatus 2, and still image capturing processing is performed in synchronization with the image capturing apparatus 1 at the same timing. In a case where it is determined that the automatic image capturing determination period of the image capturing apparatus 1 ends and the notification indicating that the automatic image capturing determination period ends is sent to the image capturing apparatus 2 via the control unit, the automatic image capturing determination period of the image capturing apparatus 2 is ended at the same time. In other words, each of the plurality of image capturing apparatuses includes the automatic image capturing determination unit for performing automatic image capturing determination processing, and the plurality of image capturing apparatuses simultaneously performs image capturing processing by transmitting via the control unit to at least one of the image capturing apparatuses other than the image capturing apparatus 1, for example, information about the timing of the image capturing trigger for the image capturing apparatus 1 determined by the automatic image capturing determination unit.

Motion image capturing processing can also be performed by a method similar to that described above. FIG. 20C illustrates an example where automatic motion image capturing is determined in the image capturing apparatus 1. In the example illustrated in FIG. 20C, the automatic image capturing determination period of the image capturing apparatus 1 matches the motion image capturing period of the image capturing apparatus 1, and the automatic image capturing determination period of the image capturing apparatus 2 matches the motion image capturing period of the image capturing apparatus 2. The present exemplary embodiment illustrates an example where the motion image capturing period of the automatic image capturing 1 is synchronized with the motion image capturing period of the automatic image capturing 2. However, after it is determined that the motion image capturing processing in the image capturing apparatus 1 is terminated, the image capturing termination determination processing in the image capturing apparatus 2 may be performed without being synchronized with the processing in the image capturing apparatus 1.

By the above-described method, the automatic image capturing processing using the plurality of image capturing apparatuses can be easily performed. In addition, the automatic image capturing processing can be performed without missing the image capturing timing by notifying the other image capturing apparatuses of the automatic image capturing determination performed in each image capturing apparatus via the controller. The viewpoint for automatic image capturing processing can be varied by angle-of-view adjustment and an image of a subject framed under different conditions, such as sizes of the subject, can be captured, and therefore the user can easily obtain a wide variety of images.

The second exemplary embodiment described above illustrates an example where a plurality of image capturing apparatuses having a configuration including pan/tilt/zoom functions illustrated in FIGS. 1A and 1B is used. Alternatively, among a plurality of image capturing apparatuses, one or more of image capturing apparatuses may have the pan/tilt/zoom functions illustrated in FIGS. 1A and 1B. An image capturing apparatus including no pan/tilt functions and including only a zoom function may also be used. An image capturing apparatus including no zoom function and including only pan/tilt functions may also be used. Among the image capturing apparatuses, image capturing apparatuses including no pan/tilt/zoom functions and having a fixed focal length may also be used. An omnidirectional image capturing apparatus which includes a plurality of image sensors and wide-angle optical systems and is configured to capture an image in all directions at once may also be used.

Third Exemplary Embodiment

<Configuration of Automatic Image Capturing System including Plurality of Automatic Image Capturing apparatuses Working In Conjunction With Each Other>

Figure 24:
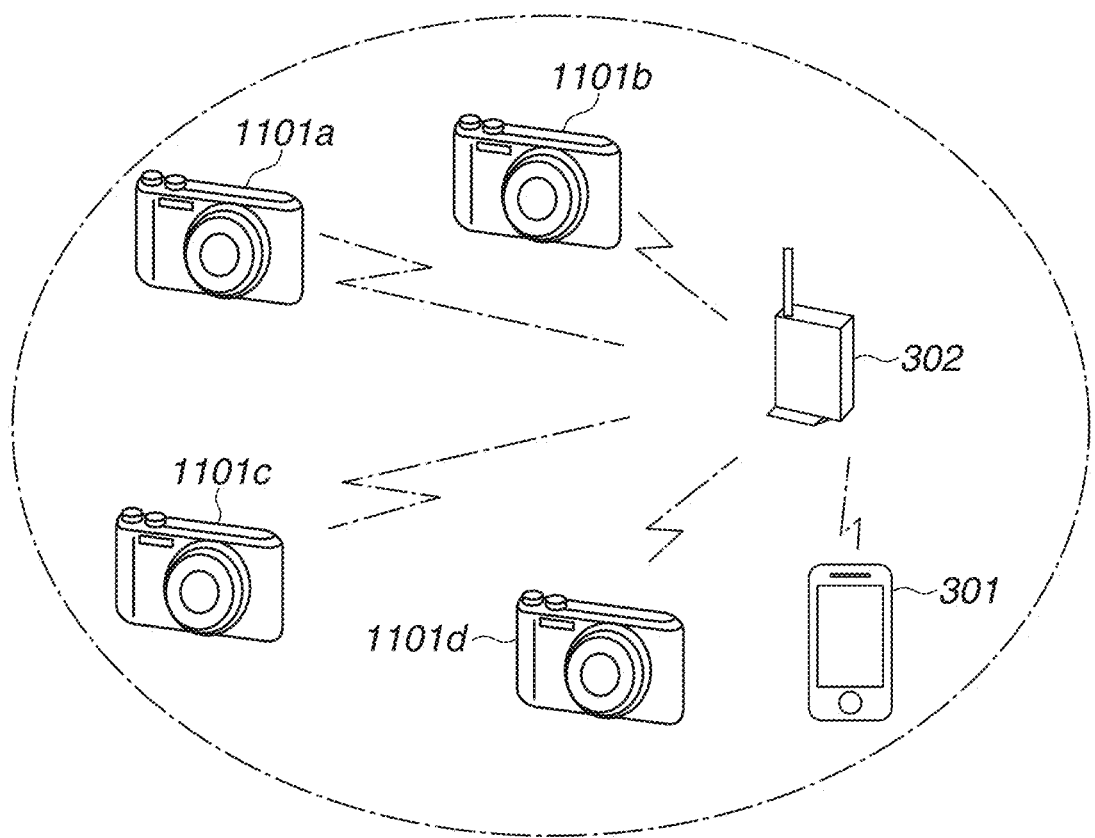
FIG. 24 is a diagram illustrating a system configuration including a plurality of image capturing apparatuses and an external apparatus according to a third exemplary embodiment.

FIG. 24 illustrates an example of an automatic image capturing system (control system) including a plurality of image capturing apparatuses working in conjunction with each other according to a third exemplary embodiment.

Image capturing apparatuses (1101a, 1101b, 1101c, and 1101d) are wirelessly connected to the controller unit (smart device) 301 including a communication function, and therefore each of the image capturing apparatuses is capable of sending an operation instruction to the other image capturing apparatuses and acquiring control information supplied from the other image capturing apparatuses. In the configuration illustrated in FIG. 24, the image capturing apparatuses (1101a, 1101b, 1101c, and 1101d) and the smart device 301 are each connected to an access point 302 to communicate with each other via the access point 302, and transfer information.

The smart device 301 exchanges data with each of the image capturing apparatuses 1101 by communication using the wireless LAN control unit 401. For example, each of the image capturing apparatuses 1101 transmits and receives data, such as an audio signal, an image signal, a compressed audio signal, and a compressed image signal, to and from the smart device 301, and the smart device 301 receives image capturing start information and subject detection information from the image capturing apparatuses 1101 and issues an operation instruction, such as image capturing performed by each of the image capturing apparatuses 1101.

Figure 25:
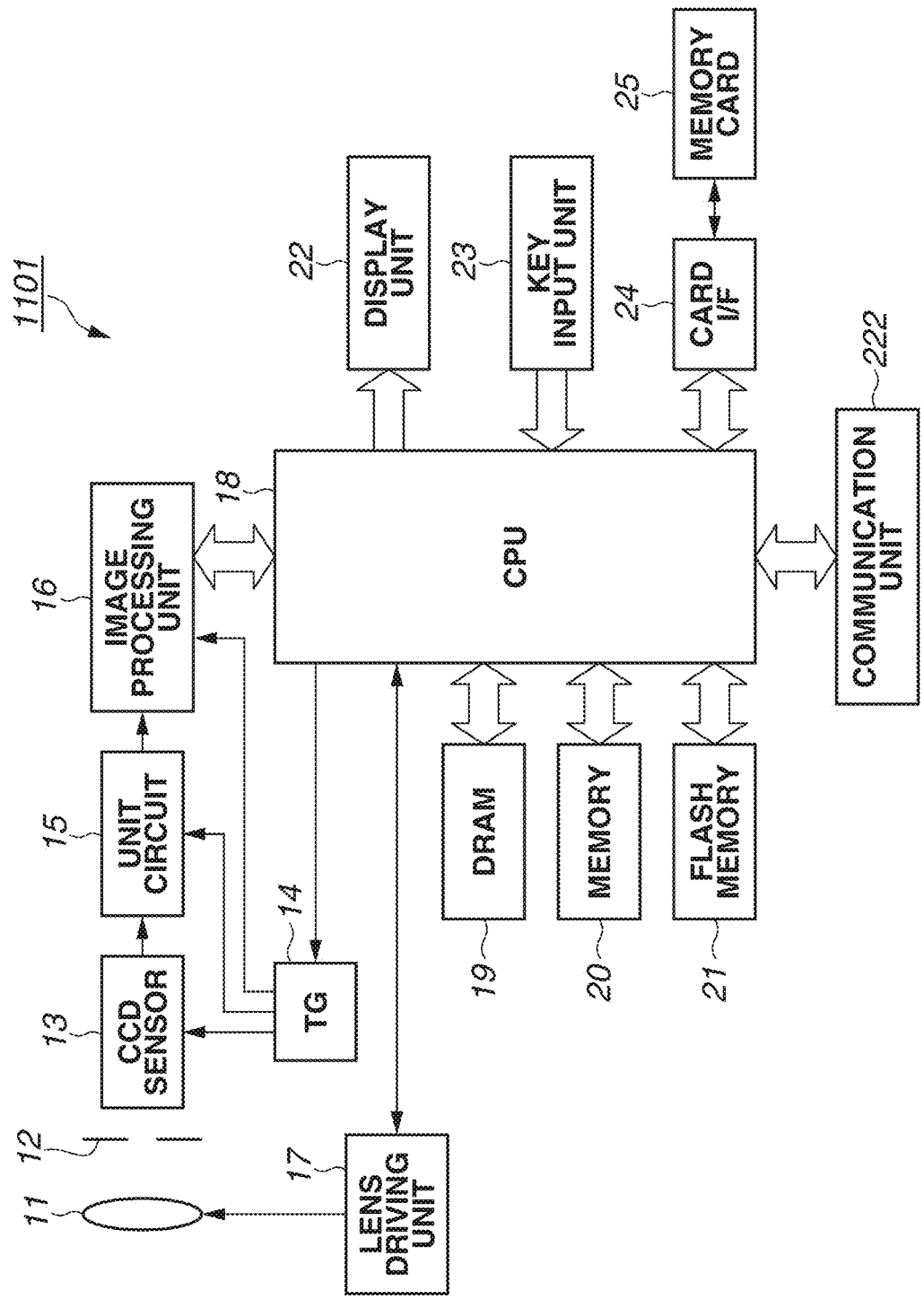
FIG. 25 is a block diagram illustrating a configuration of an image capturing apparatus 1101 according to the third exemplary embodiment.

FIG. 25 is a block diagram illustrating a configuration of the image capturing apparatuses 1101 according to the present exemplary embodiment. In the configuration illustrated in FIG. 25, the image capturing apparatus 1101 includes an image capturing lens 11, an aperture/shutter 12, a charge-coupled device (CCD) sensor 13, a timing generator (TG) 14, a unit circuit 15, an image processing unit 16, a lens driving unit 17, a CPU 18, a DRAM 19, a memory 20, a flash memory 21, a display unit 22, a key input unit 23, a card interface (I/F) 24, and a memory card 25. The image capturing lens 11 includes a zoom lens and a focus lens, and is connected with the lens driving unit 17. The lens driving unit 17 drives the image capturing lens 11 according to a control signal sent from the CPU 18, and performs auto focus driving, zoom driving, and the like. The aperture/shutter 12 includes a driving circuit (not illustrated), and is operated by the driving circuit according to a control signal sent from the CPU 18. The aperture/shutter 12 controls the amount of light entering from the image capturing lens 11. The CCD sensor (image senor) 13 converts light from the subject that is projected through the image capturing lens 11 and the aperture/shutter 12 into an electrical signal, and outputs the electrical signal as an image capturing signal to the unit circuit 15. The CCD sensor 13 is driven according to a timing signal generated by the TG 14. The unit circuit 15 includes a correlated double sampling (CDS) circuit, which performs correlated double sampling on the image capturing signal output from the CCD sensor 13 and holds the sampled image capturing signal, an automatic gain control (AGC) circuit, which performs automatic gain adjustment for the sampled image capturing signal, and an A/D converter that converts an analog image capturing signal obtained by the automatic gain adjustment into a digital signal. The unit circuit 15 is driven according to the timing signal generated by the TG 14. The image capturing signal generated by the CCD sensor 13 is sent to the image processing unit as a digital signal via the unit circuit 15. The image processing unit 16 performs processing, such as image processing (pixel interpolation processing, y-correction, generation of a luminance/chrominance signal, white balance processing, exposure correction processing, etc.) on image data sent from the unit circuit 15, compression and decompression processing on image data (e.g., compression and decompression using a JPEG format, a motion (M)-JPEG format, or a Moving Picture Experts Group (MPEG) format), trimming of a captured image, and digital zoom processing on a captured image. The image processing unit 16 is driven according to the timing signal generated by the TG 14. The DRAM 19 is used as a buffer memory for temporarily storing the image data that is captured by the CCD sensor 13 and is then sent to the CPU 18. The DRAM 19 is also used as a working memory for the CPU 18. The CPU 18 described above controls the above-described processing to be executed on captured images stored in the DRAM 19. The memory 20 stores programs that is used for the CPU 18 to control each unit of the image capturing apparatus 1101, and data for controlling each unit. The CPU 18 performs processing based on the programs. The flash memory 21 and the memory card 25 are recording media that store image data captured by the CCD sensor 13 and the like. The display unit 22 includes a color liquid crystal display and a driving circuit for driving the color liquid crystal display. In an image capturing standby state, the display unit 22 displays a captured image obtained by the CCD sensor 13 as a live view image. In a recorded image playback state, the display unit 22 displays the recorded image that is read out from the flash memory 21 or the memory card 25 and is then decompressed. The key input unit 23 includes a shutter button, an image capturing mode setting dial, and operation keys including a zoom switch, a SET key, and a four-way operational key, and outputs an operation signal corresponding to a user's key operation to the CPU 18. The memory card 25 is detachably mounted on the card I/F 24 through a card slot (not illustrated) in the main body of the image capturing apparatus 1101. The communication unit 222 establishes a communication between the image capturing apparatus 1101 and the external apparatus, like the communication unit 222 described above in the first exemplary embodiment. The communication unit 222 transmits or receives data, such as an audio signal, an image signal, a compressed audio signal, or a compressed image signal. Further, the communication unit 222 receives a control signal for image capturing, such as an image capturing start command or an image capturing termination command, and drives the image capturing apparatus 1101 in response to an instruction from an external apparatus that is configured to communicate with the image capturing apparatus 1101. The communication unit 222 is, for example, a wireless communication module, such as an infrared communication module, a Bluetooth® communication module, a wireless LAN communication module, a wireless USB, or a GPS receiver.

Also, in the third exemplary embodiment, switching from automatic control processing described above with reference to FIG. 18 to main camera control processing based on a user instruction is performed based on the determination of the priority for each image capturing apparatus described above with reference to FIG. 17. However, in the automatic image capturing system including the plurality of image capturing apparatuses working in conjunction with each other according to the third exemplary embodiment, each image capturing apparatus 1101 is not provided with a mechanism for driving pan/tilt functions. Accordingly, framing and automatic image capturing processing is performed by sending zoom information excluding pan/tilt information.

According to the third exemplary embodiment, subject information on the main image capturing apparatus is transmitted to the sub image capturing apparatus, and the sub image capturing apparatus performs automatic image capturing processing based on the subject information. Therefore, an automatic image capturing system, including a plurality of image capturing apparatuses working in conjunction with each other, that can avoid a case where a subject is lost from the sight and obtain a video image desired by a user can be provided.

Other Exemplary Embodiments

The present invention can also be implemented by processing in which a program for implementing one or more functions according to the exemplary embodiments described above is supplied to a system or apparatus via a network or storage medium, and one or more processors in a computer of the system or apparatus read out and execute the program. The present invention can also be implemented by a circuit (e.g., an application specific integrated circuit (ASIC)) for implementing one or more functions according to the exemplary embodiments described above.

The present invention is not limited to image capturing using a digital camera or a digital video camera, but instead may be incorporated in an information processing apparatus that communicates with an image capturing apparatus, such as a monitoring camera, a web camera, or a cellular phone. The information processing apparatus is not limited to a cellular phone, such as a smartphone, but instead may be a tablet computer or the like.

According to the exemplary embodiments described above, it is possible to provide an information processing apparatus capable of easily controlling a plurality of image capturing apparatuses when the plurality of image capturing apparatuses works in conjunction with each other, and a control method for the information processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is not limited to the above-described exemplary embodiments, and can be changed or modified in various ways without departing form the spirit and scope of the present invention. Accordingly, the following claims are appended to make public the scope of the present invention.

The invention claimed is:

1. An information processing apparatus comprising:
at least one processor configured to function as the following units:
a first acquiring unit configured to acquire size information about a main subject set in a main image capturing apparatus;
a second acquiring unit configured to acquire layout information for each of a plurality of image capturing apparatuses including the main image capturing apparatus;
a reception unit configured to receive from the plurality of image capturing apparatuses, at least two of the following information:
(a) information about designation of a subject by a user,
(b) information about automatic subject detection, and
(c) information about a manual operation in which a user manually performs an operation for causing an image capturing apparatus to perform at least one of pan driving, tilt driving and zoom driving;
wherein (a), (b), and (c) have an order; and
a determination unit configured to determine, for each of the plurality of image capturing apparatuses, a priority setting based on the order of information received by the reception unit; and
a controller configured to select from among the plurality of image capturing apparatuses, a sub image capturing apparatus based on the priority setting and control at least the sub image capturing apparatus among the plurality of image capturing apparatuses.

2. The information processing apparatus according to claim 1,
wherein each of the plurality image capturing apparatuses includes a rotation mechanism configured to rotationally drive a casing including an image capturing lens and an image sensor around at least two axial directions, and
wherein each of the plurality of image capturing apparatuses performs processing of searching a specific subject is performed by rotating the rotation mechanism.

3. The information processing apparatus according to claim 1, wherein each of the plurality image capturing apparatuses includes an image capturing lens including a zoom lens, and performs processing of searching a specific subject by controlling zoom driving for the zoom lens.

4. The information processing apparatus according to claim 1, wherein the information processing apparatus adjusts an angle of view in such a manner that a subject which is the same as the main subject set in the main image capturing apparatus falls within an angle of view of the sub image capturing apparatus by transmitting the size information set in the main image capturing apparatus to the sub image capturing apparatus, to automatically perform image capturing of the subject.

5. The information processing apparatus according to claim 1, wherein the main image capturing apparatus and the sub image capturing apparatus are controlled to perform framing on a same subject.

6. The information processing apparatus according to claim 1, wherein, in a case where the main image capturing apparatus has terminated a subject tracking, the sub image capturing apparatus stops working in conjunction with the main image capturing apparatus and is controlled to perform framing based on a determination in the sub image capturing apparatus.

7. The information processing apparatus according to claim 1, wherein a framing adjustment is performed in the sub image capturing apparatus in such a manner that a subject around the main subject is included or not differently from that in the main image capturing apparatus.

8. The information processing apparatus according to claim 1, further comprising:
a third acquiring unit configured to acquire information about the manual operation wherein the manual operation includes at least one of manual operations being either pan driving, tilt driving, or zoom driving for at least one of the plurality of imaging capturing apparatuses,
wherein the determination unit determines the main image capturing apparatus and the sub image capturing apparatus from among the plurality of image capturing apparatuses, based on the information acquired from the third acquiring unit, and
wherein the determination unit determines, among the plurality of image capturing apparatuses, an image capturing apparatus on which the at least one of the manual operations has been operated by the user to be an image capturing apparatus having a high priority.

9. The information processing apparatus according to claim 8, wherein, in a case where the reception unit has received the order of information about the designation of the subject the determination unit determines, among the plurality of image capturing apparatuses, an image capturing apparatus tracking a specific subject designated by the user to be the image capturing apparatus having the high priority.

10. The information processing apparatus according to claim 9, wherein, in a case where the reception unit has received the order of information about the automatic subject detection, the determination unit determines, among the plurality of image capturing apparatuses, an image capturing apparatus determined to be tracking the subject with higher accuracy to be an image capturing apparatus having a higher priority, and determines an image capturing apparatus determined to be tracking the subject with lower accuracy to be an image capturing apparatus having a lower priority.

11. The information processing apparatus according to claim 8, wherein the main image capturing apparatus and the sub image capturing apparatus are determined based on a previous learning result.

12. The information processing apparatus according to claim 8, further comprising a transmission unit configured to transmit a result of the determination to at least the main image capturing apparatus.

13. The information processing apparatus according to claim 1, further comprising a calculation unit configured to calculate position coordinates of the main subject on layout coordinates of each of the plurality of image capturing apparatuses based on the layout information for each of the plurality of image capturing apparatuses acquired by the second acquiring unit, a distance from the main image capturing apparatus to the main subject and an azimuth angle of an optical axis of the main image capturing apparatus.

14. The information processing apparatus according to claim 13,
further comprising a second transmission unit configured to transmit information to the sub image capturing apparatus,
wherein the controller, by causing the transmission unit to transmit, to the sub image capturing apparatus, information for adjusting a pan driving, a tilt driving, and a zoom driving to control the sub image capturing apparatus in a manner such that the position coordinates of the main subject are set within an angle of view of each of the plurality of image capturing apparatuses, controls the sub image capturing apparatus to perform sub image capturing.

15. The information processing apparatus according to claim 1,
wherein, in a case where the reception unit has received the information about the designation of the subject and the information about the automatic subject detection, the determination unit determines the priority setting by prioritizing the order of information about the designation of the subject,
wherein, in a case where the reception unit has received the information about the designation of the subject and the information about the manual operation, the determination unit determines the priority setting by prioritizing the order of information about the manual operation, and
wherein, in a case where the reception unit has received the information about the automatic subject detection and the information about the manual operation, the determination unit determines the priority setting by prioritizing the order of information about the manual operation.

16. The information processing apparatus according to claim 1, wherein the information about the automatic subject detection is information about a fact that, in a case where a preliminarily-registered subject has been detected, the detected preliminarily-registered subject is automatically designated as an object for image capturing.

17. The information processing apparatus according to claim 1, wherein the controller controls the sub image capturing apparatus based on information related to imaging by the main image capturing apparatus.

18. The information processing apparatus according to claim 1,
wherein the reception unit receives the information about the designation of the subject, and
wherein the controller performs control so that, among the plurality of image capturing apparatuses, an image capturing apparatus from which a distance to a designated subject is equal to or greater than a predetermined value automatically performs processing of searching a subject without following the main image capturing apparatus.

19. The information processing apparatus according to claim 1, wherein the controller controls the sub image capturing apparatus so that the sub image capturing apparatus tracks and captures the main subject in a way which is different in size of the main subject from the main image capturing apparatus.

20. The information processing system according to claim 1, wherein the determination unit determine the priority setting based on a distance from each of the plurality of image capturing apparatuses to a designated subject.

21. A control method for an information processing apparatus, comprising:
   acquiring size information about a main subject set in a main image capturing apparatus;
   acquiring layout information of each of a plurality of image capturing apparatuses including the main image capturing apparatus;
   receiving, from the plurality of image capturing apparatuses, at least two of the following information:
   (a) information about designation of a subject by a user,
   (b) information about automatic subject detection, and
   (c) information about a manual operation in which a user manually performs an operation for causing an image capturing apparatus to perform at least one of pan driving, tilt driving and zoom driving;
   wherein (a), (b), and (c) have an order;
   determining, for each of the plurality of image capturing apparatuses, a priority setting based on the order of information received by the reception unit;
   selecting, from among the plurality of image capturing apparatuses, a sub image capturing apparatus based on the priority setting; and
   controlling at least the sub image capturing apparatus among the plurality of image capturing apparatuses.

22. A non-transitory computer-readable storage medium storing a program for causing a computer to execute a control method according to claim 21.

23. The control method for an information processing apparatus according to claim 21,
   wherein, in a case where the information about the designation of the subject and the information about the automatic subject detection is received, the priority setting by prioritizing the order of information about the designation of the subject is determined,
   wherein, in a case where the information about the designation of the subject and the information about the manual operation is received, the priority setting by prioritizing the order of information about the manual operation is determined, and
   wherein, in a case where the information about the automatic subject detection and the information about the manual operation is received, the priority setting by prioritizing the order of information about the manual operation is determined.

24. An image capturing system comprising:
   a plurality of image capturing apparatuses each including a rotation mechanism configured to rotationally drive a casing including an image capturing lens and an image sensor; and
   at least one processor configured to function as the following units:
   a first acquiring unit configured to acquire size information about a main subject set in a main image capturing apparatus among the plurality of image capturing apparatuses;
   a second acquiring unit configured to acquire layout information for each of the plurality of image capturing apparatuses;
   a reception unit configured to receive, from the plurality of image capturing apparatuses, at least two of the following information:
   (a) information about designation of a subject by a user,
   (b) information about automatic subject detection, and
   (c) information about a manual operation in which a user manually performs an operation for causing an image capturing apparatus to perform at least one of pan driving, tilt driving and zoom driving;
   wherein (a), (b), and (c) have an order;
   a determination unit configured to determine, for each of the plurality of image capturing apparatuses, a priority setting based on the order of information received by the reception unit; and
   a controller configured to select, from among the plurality of image capturing apparatuses, a sub image capturing apparatus based on the priority setting and control at least a sub image capturing apparatus among the plurality of image capturing apparatuses.

25. The information processing system according to claim 24,
   wherein, in a case where the reception unit has received the information about the designation of the subject and the information about the automatic subject detection, the determination unit determines the priority setting by prioritizing the order of information about the designation of the subject,
   wherein, in a case where the reception unit has received the information about the designation of the subject and the information about the manual operation, the determination unit determines the priority setting by prioritizing the order of information about the manual operation, and
   wherein, in a case where the reception unit has received the information about the automatic subject detection and the information about the manual operation, the determination unit determines the priority setting by prioritizing the order of information about the manual operation.

* * * * *